(12) United States Patent
Moss

(10) Patent No.: US 8,949,249 B2
(45) Date of Patent: Feb. 3, 2015

(54) TECHNIQUES TO FIND PERCENTILES IN A DISTRIBUTED COMPUTING ENVIRONMENT

(75) Inventor: Karl Moss, Raleigh, NC (US)

(73) Assignee: SAS Institute, Inc., Cary, NC (US)

( * ) Notice: Subject to any disclaimer, the term of this patent is extended or adjusted under 35 U.S.C. 154(b) by 111 days.

(21) Appl. No.: 12/815,702

(22) Filed: Jun. 15, 2010

(65) Prior Publication Data

US 2011/0307475 A1  Dec. 15, 2011

(51) Int. Cl.
G06F 17/30 (2006.01)
G06Q 30/02 (2012.01)
G06Q 50/20 (2012.01)

(52) U.S. Cl.
CPC ............ *G06Q 30/0282* (2013.01); *G06F 17/30* (2013.01); *G06Q 50/20* (2013.01)
USPC ........... 707/748; 707/688; 707/700; 707/750; 707/752; 707/754

(58) Field of Classification Search
CPC ...................................................... G06F 17/30
USPC ......... 707/705–710, 722–723, 728, 600, 603, 707/607, 609, 688, 700, 748, 750, 752, 754, 707/758
See application file for complete search history.

(56) References Cited

U.S. PATENT DOCUMENTS

| | | | |
|---|---|---|---|
| 5,745,654 A * | 4/1998 | Titan ............................... | 706/20 |
| 6,434,570 B1 | 8/2002 | Rangan | |
| 6,622,138 B1 * | 9/2003 | Bellamkonda et al. ................ | 1/1 |
| 6,728,704 B2 * | 4/2004 | Mao et al. .............................. | 1/1 |
| 7,197,474 B1 * | 3/2007 | Kitts ............................. | 705/7.31 |
| 7,231,399 B1 * | 6/2007 | Bem et al. .............................. | 1/1 |
| 2002/0065793 A1 | 5/2002 | Arakawa et al. | |
| 2002/0198766 A1 * | 12/2002 | Magrino et al. ................ | 705/11 |
| 2003/0078924 A1 * | 4/2003 | Liechty et al. ..................... | 707/7 |
| 2005/0060222 A1 * | 3/2005 | White ............................. | 705/10 |
| 2005/0097067 A1 * | 5/2005 | Kirshenbaum ................. | 706/46 |
| 2006/0095378 A1 * | 5/2006 | Aggarwal et al. ............... | 705/51 |
| 2006/0116996 A1 * | 6/2006 | Brill et al. ......................... | 707/3 |

(Continued)

FOREIGN PATENT DOCUMENTS

WO  WO 03/076928   *  9/2003
WO  WO 2007/067329  *  6/2007

OTHER PUBLICATIONS

Hilla Becker et al. "Real-time ranking of electrical feeders using expert advice", workshop on data stream analysis, Mar. 2007 pp. 1-7.*

(Continued)

*Primary Examiner* — Srirama Channavajjala
(74) *Attorney, Agent, or Firm* — Kacvinsky Daisak Bluni PLLC

(57) ABSTRACT

Techniques to search for data elements in a distributed computing environment are described. An apparatus may comprise a processor and a memory unit communicatively coupled to the processor. The memory unit may store a correlation module that when executed by the processor is operative to determine a target rank position at a target percentile rank within a total data set. The correlation module may determine a target data item at the target rank position for the total data set using candidate data items at candidate rank positions for each of multiple sorted data subsets of the total data set, and correlation values associated with each of the candidate data items. Other embodiments are described and claimed.

27 Claims, 18 Drawing Sheets

(56) References Cited

U.S. PATENT DOCUMENTS

| | | |
|---|---|---|
| 2006/0195440 A1* | 8/2006 | Burges et al. .................... 707/5 |
| 2007/0150298 A1* | 6/2007 | Barney .............................. 705/1 |
| 2007/0192319 A1* | 8/2007 | Finley et al. ..................... 707/7 |
| 2007/0233868 A1* | 10/2007 | Tyrrell et al. ................. 709/226 |
| 2008/0071497 A1 | 3/2008 | Todd |
| 2008/0140347 A1 | 6/2008 | Ramsey et al. |
| 2008/0300960 A1* | 12/2008 | Williams ........................ 705/10 |
| 2008/0320018 A1 | 12/2008 | Smith et al. |
| 2009/0006398 A1* | 1/2009 | Lam et al. ........................ 707/7 |
| 2009/0007137 A1 | 1/2009 | Duffy et al. |
| 2009/0099779 A1* | 4/2009 | Bouzas et al. ................. 702/17 |
| 2010/0082617 A1* | 4/2010 | Liu et al. ....................... 707/729 |
| 2010/0121685 A1* | 5/2010 | Mahadevan et al. ............ 705/11 |
| 2010/0235362 A1* | 9/2010 | Cormode et al. ............. 707/748 |

OTHER PUBLICATIONS

Iyer, Balakrishna R., et al. "Percentile Finding Algorithm for Multiple Sorted Runs", Proceedings of the Fifteenth International Conference on Very Large Data Bases, pp. 135-144, Amsterdam, 1989.

Pawlowski, Markus et al. "Parallel Sorting of Large Data Volumes on Distributed Memory Multiprocessors", Institute of Computer Science, University of Technology, 19 pages.

"Chapter 5, Percentiles and Percentile Ranks", 17 pages.

\* cited by examiner

*300*

RECEIVE A TARGET PERCENTILE RANK BY A PROCESSOR
*302*

SELECT A TARGET RANK POSITION AT THE TARGET PERCENTILE RANK WITHIN THE TOTAL DATA SET
*304*

DETERMINE A TARGET DATA ITEM AT THE TARGET RANK POSITION FOR THE TOTAL DATA SET USING CANDIDATE DATA ITEMS AT CANDIDATE RANK POSITIONS FOR EACH OF MULTIPLE SORTED DATA SUBSETS OF THE TOTAL DATA SET, AND CORRELATION VALUES ASSOCIATED WITH EACH OF THE CANDIDATE DATA ITEMS
*306*

FIG. 3

TECHNIQUES TO FIND PERCENTILES IN A DISTRIBUTED COMPUTING ENVIRONMENT

BACKGROUND

Percentiles and percentile ranks are relative measures often used to provide information about how a specific data element within a data set relates to a larger group of the data set or the entire data set itself. For instance, percentiles and percentile ranks may be used to evaluate academic performance. Most nationally standardized test scores are reported as percentile ranks, such as deciles or quartiles. A student may find how they rank among peers based on a percentile rank for a test score of the student, such as whether it falls within an upper $5^{th}$ percentile, upper $50^{th}$ percentile, and so forth. In general, a percentile typically refers to a value and a percentile rank typically refers to a percentage. For instance, a percentile may refer to a particular test score or value (e.g., 95), while a percentile rank may be used to determine where a particular score or value falls within a broader distribution (e.g., top $5^{th}$ percentile or 5%).

Finding statistical information such as percentiles or percentile ranks becomes more difficult as a size of a total data set increases. In some cases, data sets for commercial applications may be on the order of terabytes or larger sets of data. In order to efficiently process such massive data sets, a single data set is typically distributed across multiple processing nodes communicating over a network. Each of the multiple processing nodes may then process subsets of data in a parallel manner. This distributed processing approach provides benefits such as reduced processing times and processing loads, at the cost of increased coordination between the distributed processors and network resources used for such coordination. Such costs may potentially increase when attempting to find percentiles or percentile ranks across a distributed data set. For instance, conventional solutions attempt to move subsets of data from remote processing nodes across a network to a central processing node for sorting and ranking operations in order to locate a specific percentile within the overall data set. This may take a relatively long period of time and consume significant amounts of computing and communications resources, which may be unacceptable for some applications. It is with respect to these and other considerations that the present improvements are needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one embodiment, for example, an apparatus may comprise a processor and a memory unit communicatively coupled to the processor. The memory unit may store a correlation module that when executed by the processor is operative to determine a target rank position at a target percentile rank within a total data set. The total data set may be distributed among one or more processors. The correlation module may determine a target data item at the target rank position for the total data set using candidate data items at candidate rank positions for each of multiple sorted data subsets of the total data set, and correlation values associated with each of the candidate data items. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 3 illustrates an embodiment of a logic flow.

DETAILED DESCRIPTION

Various embodiments are generally directed to techniques for finding percentiles within a distributed computing environment. In particular, various embodiments may implement one or more enhanced ranking techniques to efficiently find a percentile value for any requested percentile rank from within a total data set having multiple data items distributed among multiple sorted data subsets across multiple processing nodes.

The enhanced ranking techniques may provide several advantages over conventional techniques. For example, the enhanced ranking techniques may retain some or all of the benefits gained by distributed processing of larger data sets, while decreasing ranking times for specific data items within the distributed data subsets. The enhanced ranking techniques reduce, and in some cases eliminate, the need to merge sorted data subsets in order to rank a specific data item within a total data set. Reducing or eliminating merge operations may result in reducing ranking times by several orders of magnitude, in some cases from seconds to milliseconds depending on a number of processing nodes. In another example, the enhanced ranking techniques may also decrease communication traffic between processing nodes since large portions of distributed data subsets no longer need to be communicated to other processing nodes, such as a central processing node. In yet another example, a processing node implementing the enhanced ranking techniques may utilize fewer processing cycles to rank a specific data item, thereby conserving computing resources. Other advantages exist as well.

Figure 1:
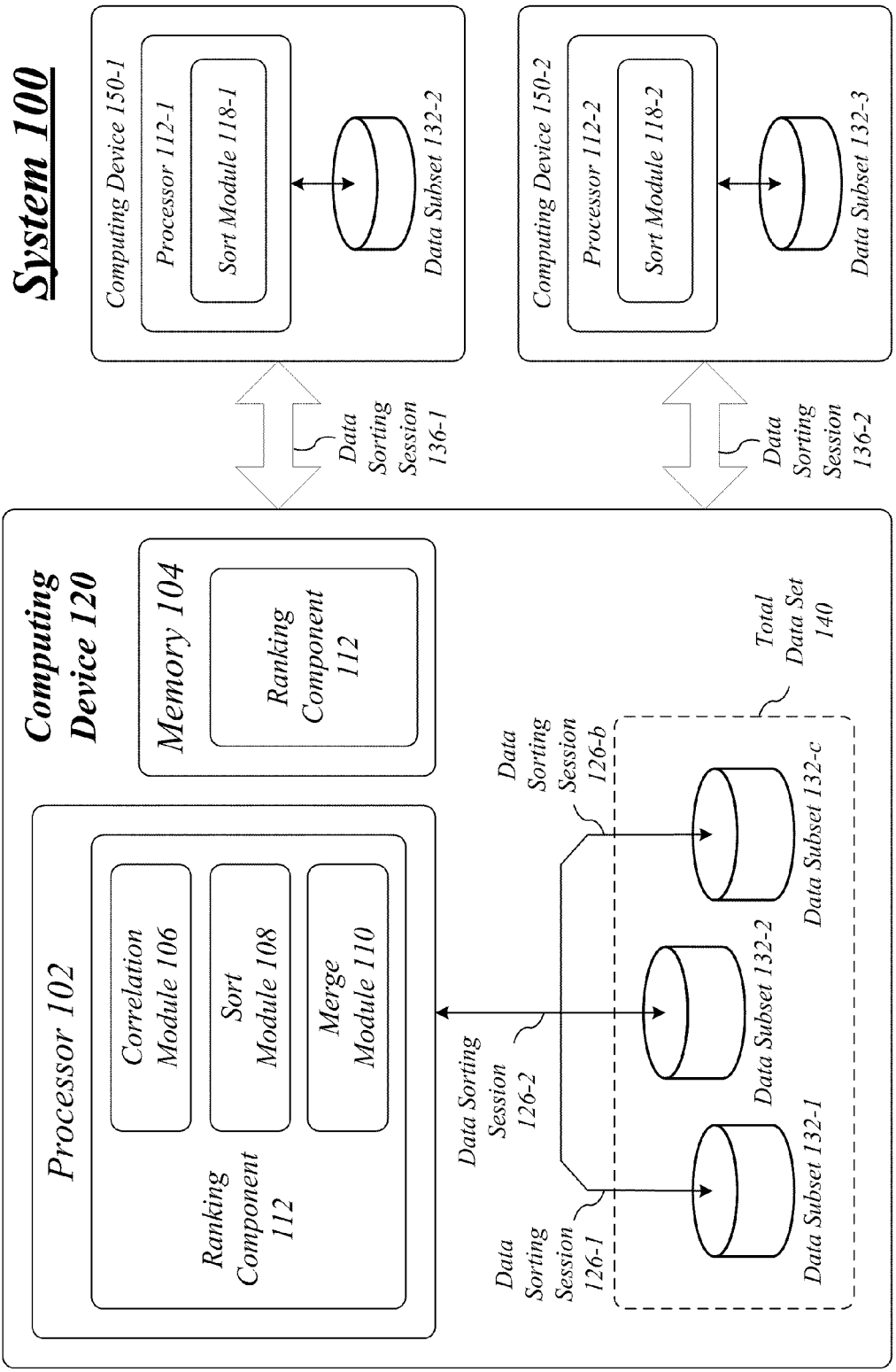
FIG. 1 illustrates an embodiment of a system.

FIG. 1 illustrates a block diagram for a system 100 designed to implement various enhanced ranking techniques for data items within a distributed computing environment. The system 100 may be implemented as part of a computing system or communications system, examples of which are described in more detail with reference to FIGS. 17, 18. Although the system 100 as shown in FIG. 1 has a limited number of elements in a certain topology, it may be appreciated that the system 100 may include more or less elements in alternate topologies as desired for a given implementation.

In the illustrated embodiment shown in FIG. 1, the system 100 comprises multiple electronic devices, including a local computing device 120 and one or more remote computing devices 150-1-$a$. It is worthy to note that "a" and "b" and "c" and similar designators as used herein are intended to be variables representing any positive integer. Thus, for example, if an implementation sets a value for a=5, then a complete set of computing devices 150-1-$a$ may include computing devices 150-1, 150-2, 150-3, 150-4 and 150-5. The embodiments are not limited in this context.

The local computing device 120 and the one or more remote computing devices 150-1-$a$ may each be implemented as any electronic device having computing and/or communications capabilities. Examples of the local computing device 120 and the one or more remote computing devices 150-1-$a$ may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a mainframe computer, a supercomputer, a network appliance, a web appliance, multiprocessor systems, processor-based systems, or any combination thereof. The embodiments are not limited in this context.

In various embodiments, the local computing device 120 and the one or more remote computing devices 150-1-$a$ may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor 102, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices of system 100, and components and/or modules within a device of system 100, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, the local computing device 120 and one or more remote computing devices 150-1-$a$ of the system 100 may be organized as a distributed system. A distributed system typically comprises multiple autonomous computers that communicate through a computer network. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include without limitation a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced ranking techniques, it may be appreciated that the enhanced ranking techniques may be implemented by a single computing device as well. The embodiments are not limited in this context.

In various embodiments, the local computing device 120 may operate as a central processing node or coordinating device to coordinate distributed processing operations implemented by the local computing device 120 and/or one or more of the computing devices 150-1-$a$. As shown, the local computing device may comprise one or more processors 102 and one or more memory units 104 communicatively coupled to the processors 102. The memory unit 104 may store various software programs, including a ranking component 112. The ranking component 112 may further comprise a correlation module 106, a sort module 108, and a merge module 110. In one embodiment, each of these components and/or modules may be software elements that when executed by the processor 102 performs a discrete set of operations.

The ranking component 112 is generally arranged to manage ranking operations needed to find a percentile value at a given percentile rank from within a total data set 140 divided into multiple data subsets 132-1-$c$. The total data set 140 typically comprises a distribution of multiple data items, data elements or samples within a given population (collectively referred to herein as "data items"). In one embodiment, the data items may each comprise a numeric value. The data subsets 132-1-$c$ may each comprise a discrete grouping or collection of one or more data items from the total data set 140. By way of example, the total data set 140 may have "1,000,000" data items evenly divided into 10 data subsets 132-1 to 132-10 each comprising "100,000" data items.

A particular size implemented for the total data set 140 or the various data subsets 132-1-$c$ may vary according to a particular application or task. However, a typical size for the total data set 140 may run into terabytes or larger, thereby needing distributed processing in the form of one or more data subsets 132-1-$c$ to process the total data set 140 within acceptable time frames. Acceptable time frames may vary according to a given application, but for commercial applications acceptable time frames are typically measured in centiseconds, milliseconds, or shorter time intervals. As such, the ranking component 112 may divide the total data set 140 into various data subsets 132-1-c, and allocate each of the various data subsets 132-1-c to the local computing device 120 and one or more of the remote computing devices 150-1-a, such as the remote computing devices 150-1, 150-2 shown in FIG. 1. Although FIG. 1 shows only two remote computing devices 150-1, 150-2 for purposes of clarity, it may be appreciated that any number of computing devices 150-1-a may be used as desired for a given implementation. The embodiments are not limited in this context.

The ranking component 112 may divide the total data set 140 into one or more data subsets 132-1-c, and distribute the data subsets 132-1-c to multiple processing nodes of the system 100. Each processing node may be assigned one or more data subsets to process. A processing node may represent some discrete measure of computational resources. Examples of a processing node may include without limitation a processing thread, multiple processing threads, a processor, multiple processors, and so forth. One or more processing nodes may be implemented on a single device or multiple devices. For instance, when implemented by a single device such as the local computing device 120, a processing node may comprise a processing thread implemented on the single processor 102. In this case multiple processing nodes may be implemented as multiple processing threads on the single processor 102, a single processing thread on each of multiple processors 102, multiple processing threads on multiple processors 102, or some combination thereof. In another example, when implemented by multiple devices such as the local computing device 120 and one or more remote computing devices 150-1-a, a processing node may comprise an entire computing device having one or more processors. In this case, multiple processing nodes may be implemented as two or more computing devices, such as the local computing device 120 and the remote computing devices 150-1, 150-2. It may be appreciated that multiple processing nodes may be implemented in any combination of single computing devices and multiple computing devices, each having one or more processors capable of executing one or more processing threads, as desired for a given implementation. The embodiments are not limited in this context.

In various embodiments, multiple processing nodes as implemented by the local computing device 120 and one or more remote computing devices 150-1-a may be arranged to process multiple data subsets 132-1-c of the total data set 140 in a parallel or sequential manner. In one embodiment, the local computing device 120 and the remote computing devices 150-1-a may each perform a discrete set of operations for respective data subsets 132-1-c. In one embodiment, for example, each of the local computing device 120 and the remote computing devices 150-1-a may be arranged to execute respective sort modules 108 and 118-1-s. The sort modules 108 and 118-1-s may perform sorting operations to sort data elements from respective data subsets 132-1-c into a defined order (e.g., ascending or descending numeric values). Data subsets 132-1-c for the total data set 140 that have been sorted into a defined order may be referred to herein as "sorted data subsets."

More particularly, the sort module 108 of the local computing device 120 may sort one or more data subsets 132-1-c of the total data set 140 into some defined sorting order in one or more data sorting sessions 126-1-d. Sort orders may vary, examples of which include a descending order (e.g., smallest values to largest values), an ascending order (e.g., largest values to smallest values), and so forth. Similarly, the sort modules 118-1, 118-2 of the respective remote computing devices 150-1, 150-2 may each sort one or more data subsets 132-1-c in one or more data sorting sessions 136-1-e, such as the respective data sorting session 136-1, 136-2. In a typical implementation, each of the sort module 108 and sort modules 118-1, 118-2 may each sort different data subsets 132-1-c to form sorted data subsets 410-1-m (as described with reference to FIG. 4). For instance, the sort module 108 and sort modules 118-1, 118-2 may sort respective data subsets 132-1, 132-2 and 132-3 to form respective sorted data subsets 410-1, 410-2 and 410-3, although that may vary according to different implementations. Once the data subsets 132-1, 132-2 and 132-3 are sorted into a defined sorting order, the computing device 120 may be notified, and the correlation module 106 and the merge module 110 may be used to search for a target data item from the total data set using the sorted data subsets stored on the local computing device 120 and the remote computing devices 150-1, 150-2.

The ranking component 112 may implement one or more enhanced ranking techniques to find a percentile value at a percentile rank from within a total data set having data items distributed among multiple sorted data subsets 132-1-c across multiple processing nodes implemented by the local computing device 120 and the remote computing devices 150-1, 150-2. A percentile value comprises a numeric value for a data item at a given rank within an ordered ranking of all values within the total data set 140. For instance, if the total data set 140 contains "5" data items each having respective percentile values "1, 3, 5, 7 and 9," and a requested percentile rank is the $20^{th}$ percentile of the total data set 140, then the percentile value comprises the percentile value of "3."

In various embodiments, the ranking component 112 may implement one or more enhanced ranking techniques to efficiently find a percentile value from a given percentile rank using the correlation module 106, the merge module 110, or a combination of the correlation module 106 and the merge module 110.

The correlation module 106 may be executed by the processor 102 to generally perform correlation operations for the sorted data subsets 410-1-m of the total data set 140. In one embodiment, the correlation module 106 may implement an iterative correlation algorithm arranged to iteratively approximate and compare percentiles from each of multiple sorted data subsets 132-1-c until a percentile value for the total data set 140 is found. Additionally or alternatively, the correlation module 106 may implement an iterative correlation algorithm arranged to iteratively approximate and compare percentiles from each of multiple sorted data subsets 132-1-c to find approximate starting positions for the merge module 110. The merge module 110 may then perform a limited number of merge operations until a percentile value for the total data set 140 is found.

The merge module 110 may be executed by the processor 102 to generally perform merge operations for the sorted data subsets 410-1-m of the total data set 140. The merge module 110 may be arranged to perform various merge algorithms to merge some or all of the sorted data subsets 410-1-m into a completely sorted total data set 140. The merge module 110 may merge different amounts of data items from each of the sorted data subsets 410-1-m depending on results from operations of the correlation module 106.

Figure 2:
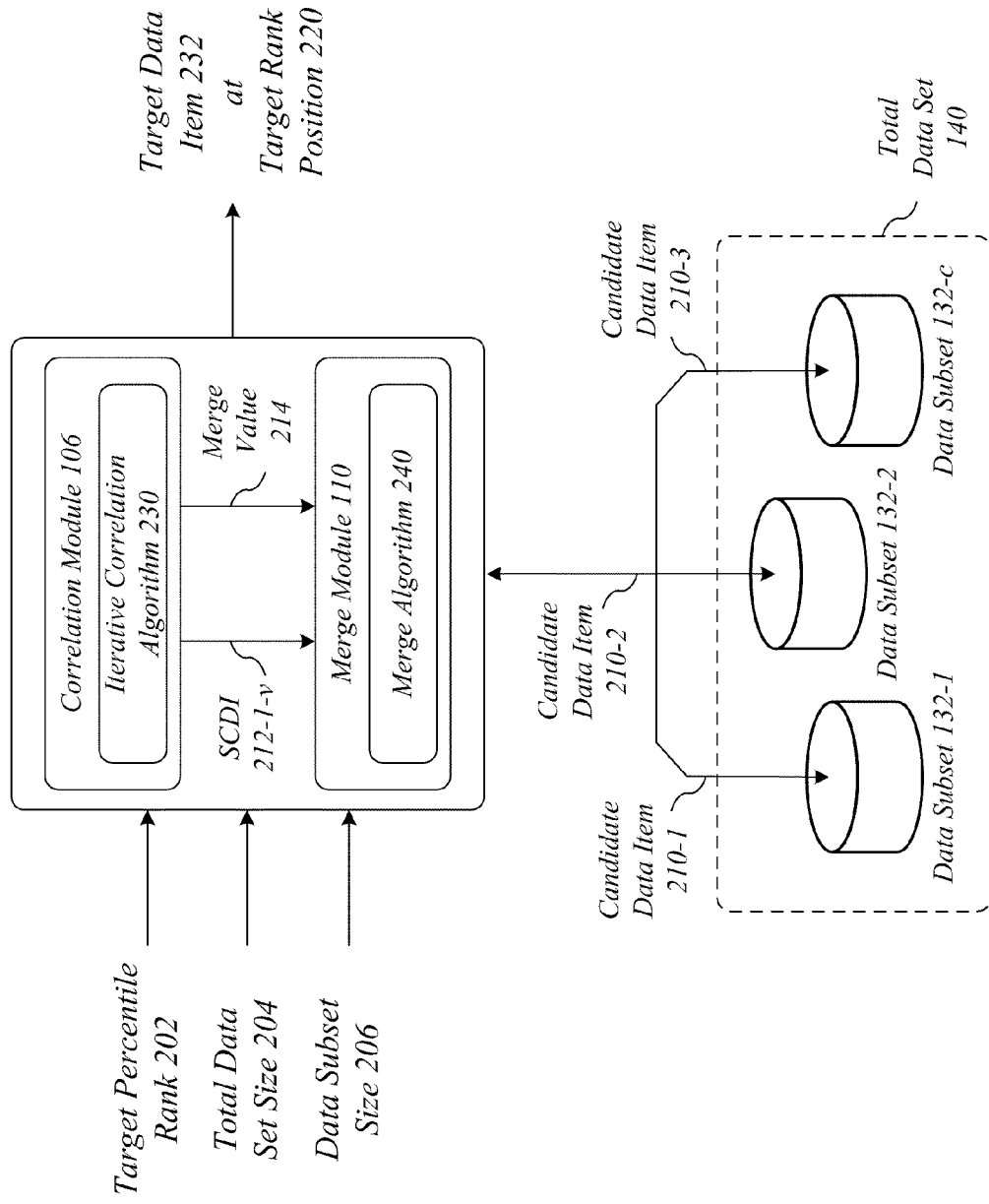
FIG. 2 illustrates an embodiment of a ranking component.

FIG. 2 illustrates a more detailed block diagram for the ranking component 112 of the computing device 120. In the illustrated embodiment shown in FIG. 2, the correlation module 106 may further comprise an iterative correlation algorithm 230 and the merge module 110 may further comprise a merge algorithm 240. The embodiments, however, are not limited to these elements.

In various embodiments, the correlation module 106 may receive as input a target percentile rank 202, a total data set size 204 and a data subset size 206. The target percentile rank 202 may represent any percentile rank used to identify a target rank position 220 of a target data item 232. A percentile rank is typically expressed as a percentage, such as a $5^{th}$ percentile (5%), a $50^{th}$ percentile (50%), a $95^{th}$ percentile (95%), and any other selected percentile rank within a range of 0-100%. The total data set size 204 may represent a total number of data items within the total data set 140. For instance, the total data set size 204 may comprise 1,000,000 data items. The data subset size 206 may represent a total number of data items within a given data subset 132-1-c. For instance, if the "1,000,000" data items of the total data set 140 were evenly allocated to ten computing devices 112-1 to 112-10 for sorting operations, then there would be ten data subsets 132-1 to 132-10 each having a data subset size 206 of "100,000" data items.

In various embodiments, the iterative correlation algorithm 230 may be used by itself to find a specific target data item 232. In one embodiment, for example, the correlation module 106 may use each of the input values to generate and send as output a target rank position 220 of a target data item 232. The target data item 232 may comprise a percentile value at the given target percentile rank 202. The correlation module 106 may accomplish this using an iterative correlation algorithm 230. The iterative correlation algorithm 230 may iteratively generate correlation values for candidate data items 210-1-f from the multiple sorted data subsets 410-1-m, and determine whether the correlation values match the target data item 232 at the target rank position 220. When the correlation values match the target data item 232 at the target rank position 220, the iterative correlation algorithm 230 completes. When the correlation values do not match the target data item 232 at the target rank position 220, the iterative correlation algorithm 230 performs another iteration to generate new correlation values for a new set of candidate data items 210-1-f. The iterative correlation algorithm 230 continues to perform iterations of the correlation operations until converging on a match for the target data item 232 at the target rank position 220.

In various embodiments, the iterative correlation algorithm 230 may be used in combination with a merge algorithm 240 of the merge module 110. For instance, the iterative correlation algorithm 230 may complete one or more iterations of correlation operations on a set of candidate data items 210-1-f. If a match has not been found after the one or more iterations, the iterative correlation algorithm 230 may output a set of starting candidate data items 212-1-v for use as starting positions for merge operations performed by the merge algorithm 240 of the merge module 110. The iterative correlation algorithm 230 may also output a merge value 214 indicating a number of merge operations needed until the target data item 232 at the target rank position 220 is found. In one embodiment, the iterative correlation algorithm 230 may compute the merge value by subtracting a closest correlation value from the target rank position 220, as described in more detail below.

The merge module 110 may receive as input the starting candidate data items 212-1-v and the merge value 214, and perform a number of merge operations indicated by the merge value 214 beginning at the starting candidate data items 212-1-v until the specific target data item 232 at the target rank position 220 is found. In one embodiment, the merge operations may comprise comparing candidate data items 210-1-f from each of the sorted data subsets 132-1-c to find a candidate data item 210-1-f with a lowest (or highest) value, updating an index pointer for the sorted data subset 132-1-c with the lowest (or highest) value, and continuing such operations until the target data item 232 at the target rank position 220 is found. Typically the number of merge operations needed after correlation operations of the iterative correlation algorithm 240 is significantly less than a number of merge operations used by the merge algorithm 240 alone in finding the specific target data item 232 at the target rank position 220.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 3 illustrates one embodiment of a logic flow 300. The logic flow 300 may be representative of some or all of the operations executed by one or more embodiments described herein. For instance, the logic flow 300 may be representative of some or all of the operations executed by the correlation module 106 implemented for the local computing device 120.

In the illustrated embodiment shown in FIG. 3, the logic flow 300 may receive a target percentile rank by a processor at block 302. For example, the correlation module 106 may receive the target percentile rank 202. The target percentile rank 202 may represent any percentile rank used to identify a target rank position 220 of a target data item 232. For instance, the target percentile rank 202 may comprise a $5^{th}$ percentile (5%), a 50th percentile (50%), a $95^{th}$ percentile (95%), and any other requested percentile rank within a range of 0-100%. In one embodiment, for example, the target percentile rank 202 may represent a percentile rank requested by a user (e.g., a user of the local computing device 120).

The logic flow 300 may determine a target rank position at the target percentile rank within a total data set at block 304. For example, the correlation module 106 may determine a target rank position 220 at the target percentile rank 202 within the total data set 140. The correlation module 106 may determine the target rank position 220 for the total data set 140 from the target percentile rank 202 and the total data set size 204. For instance, continuing with the previous example, assume the target percentile rank 202 was set for the $5^{th}$ percentile (5%). The $5^{th}$ percentile of "1,000,000" data items would comprise a target rank position 220 having a value of "50,000" or 5% of "1,000,000." The correlation module 106 may attempt to locate a target data item 232 located at the $5^{th}$ percentile position of "50,000" within the total data set size 204 of "1,000,000."

The logic flow 300 may determine a target data item at the target rank position for the total data set using candidate data items at candidate rank positions for each of multiple sorted data subsets of the total data set, and correlation values associated with each of the candidate data items at block 306. For example, the correlation module 106 may determine a target data item 232 at the target rank position 220 for the total data set 140 using candidate data items 210-1-f at candidate rank positions for each of multiple sorted data subsets 410-1-m of the total data set 140. In one embodiment, the correlation module 106 may determine the target data item 232 using correlation values associated with each of the candidate data items 210-1-f as generated and evaluated by the iterative correlation algorithm 230.

As previously described, some embodiments may use the iterative correlation algorithm 230 alone or in combination with the merge algorithm 240 of the merge module 110. In the latter case, the iterative correlation algorithm 230 may complete one or more iterations of correlation operations on a set of candidate data items 210-1-f. If a match has not been found after the one or more iterations, the iterative correlation algorithm 230 may output a set of starting candidate data items 212-1-v and a merge value 214. The merge module 110 may receive as input the starting candidate data items 212-1-v and the merge value 214, and perform a number of merge operations indicated by the merge value 214 beginning at the starting candidate data items 212-1-v until the specific target data item 232 at the target rank position 220 is found. Typically the number of merge operations needed after correlation operations of the iterative correlation algorithm 240 is significantly less than a number of merge operations used by the merge algorithm 240 alone in finding the specific target data item 232 at the target rank position 220. Therefore, using the iterative correlation algorithm 230 in combination with the merge algorithm 240 reduces some disadvantages of the merge algorithm 240 when used alone. The merge algorithm 240 and its associated disadvantages may be described in more detail with reference to FIGS. 4-7.

Figure 4:
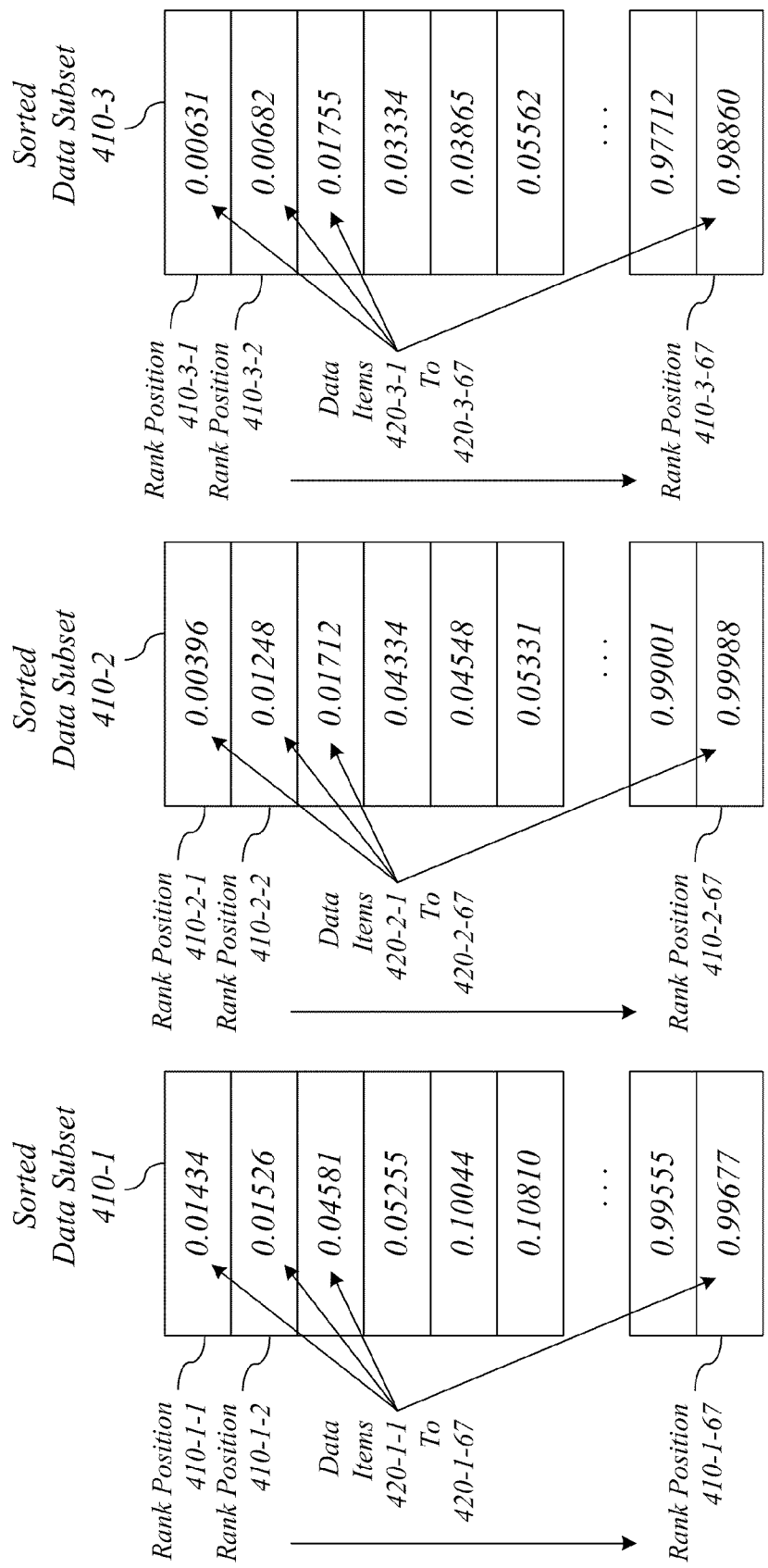
FIG. 4 illustrates an embodiment of a logic diagram for search operations.

FIG. 4 illustrates a logic diagram 400 for merge operations performed by the merge algorithm 240. Assume a total data set 140 has a total data set size 204 comprising "201" total data items. Further assume the total data set 140 is formed into three data subsets 132-1, 132-2 and 132-3 allocated to the sort module 108 and two sort modules 118-1, 118-2 for sorting operations. The sort module 108 and two sort modules 118-1, 118-2 may sort the respective data subsets 132-1, 132-2 and 132-3 to produce respective sorted data subsets 410-1, 410-2 and 410-3. Each of the sorted data subsets 410-1, 410-2 and 410-3 may have a data subset size 206 comprising "67" data items sorted in descending order from smallest value to largest value. For instance, the sorted data subset 410-1 may comprise "67" data items 420-1-1 to 420-1-67 having respective rank positions 410-1-1 to 410-1-67, the sorted data subset 410-2 may comprise "67" data items 420-2-1 to 420-2-67 having respective rank positions 410-2-1 to 410-2-67, and the sorted data subset 410-3 may comprise "67" data items 420-3-1 to 420-3-67 having respective rank positions 410-3-1 to 410-3-67.

Further assume that the target percentile rank 202 is set at the 5$^{th}$ percentile (5%). A target rank position 220 at the 5$^{th}$ percentile is 10, which may be derived by Equation (1) as follows:

$$n = \frac{N}{100}p + \frac{1}{2}$$ Equation (1)

In Equation (1), n is the target rank position 220, N is the number of ordered values of the total data set 204, and p is the target percentile rank 202. The target rank position 220 of (n) is rounded to the nearest integer and the percentile is found by taking the value that corresponds to that rank. In one embodiment, Equation (1) may be implemented using integer arithmetic which truncates any remainders after division, and the addition of 0.5 ensures proper rounding operations. It may be appreciated, however, that Equation (1) may potentially produce different results depending on a type of mathematical precision used for a given implementation.

The merge algorithm 240 maintains an index pointer for each of the sorted data subsets 410-1, 410-2 and 410-3, compares a value for each data item at a current rank position for each of the sorted data subsets 410-1, 410-2 and 410-3, and takes the lowest value. The index pointer for the sorted data subsets 410-1, 410-2 or 410-3 from which the lowest value came is then advanced. The merge algorithm 240 repeats this process until the target data item 232 is found. Examples of operations for the merge algorithm 240 may be described with reference to FIGS. 5-7.

Figure 5:
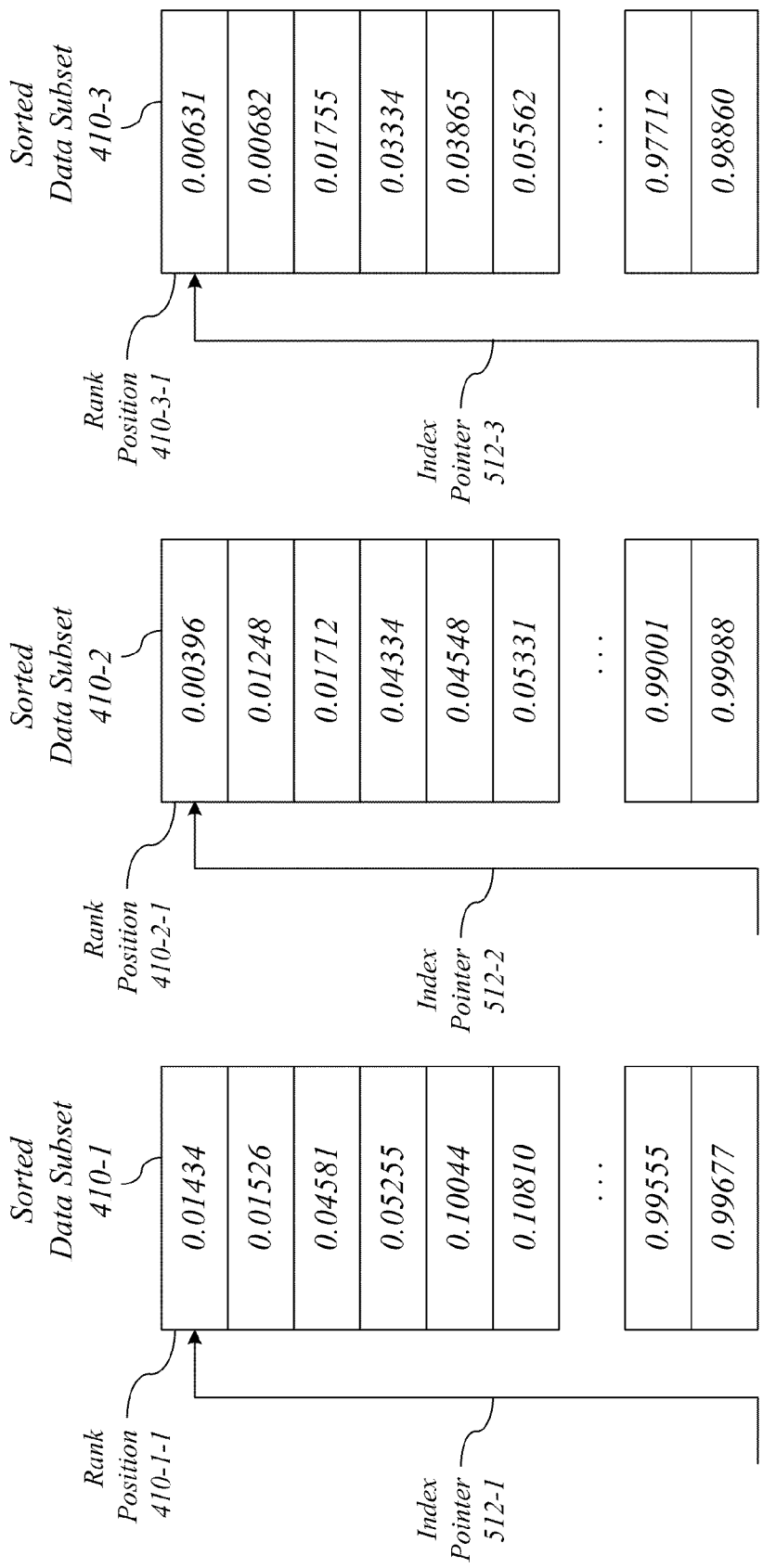
FIG. 5 illustrates an embodiment of a logic diagram for search operations.

FIG. 5 illustrates a logic diagram 500 for merge operations performed by the merge algorithm 240. As shown, a first index pointer 512-1 for the first sorted data subset 410-1 is initially pointing at the rank position 410-1-1 having a data item of "0.01434," a second index pointer 512-2 for the second sorted data subset 410-2 is initially pointing at the rank position 410-2-1 having a data item of "0.00396," and a third index pointer 512-3 for the third sorted data subset 410-3 is pointing at the rank position 410-3-1 having a data item of "0.00631." The merge algorithm 240 compares the data items at rank positions 410-1-1, 410-2-1 and 410-3-1 to find a lowest value. The lowest value of "0.01434, 0.00396 and 0.00631 is 0.00396," which is located at the rank position 410-2-1 of the second sorted data subset 410-2.

Figure 6:
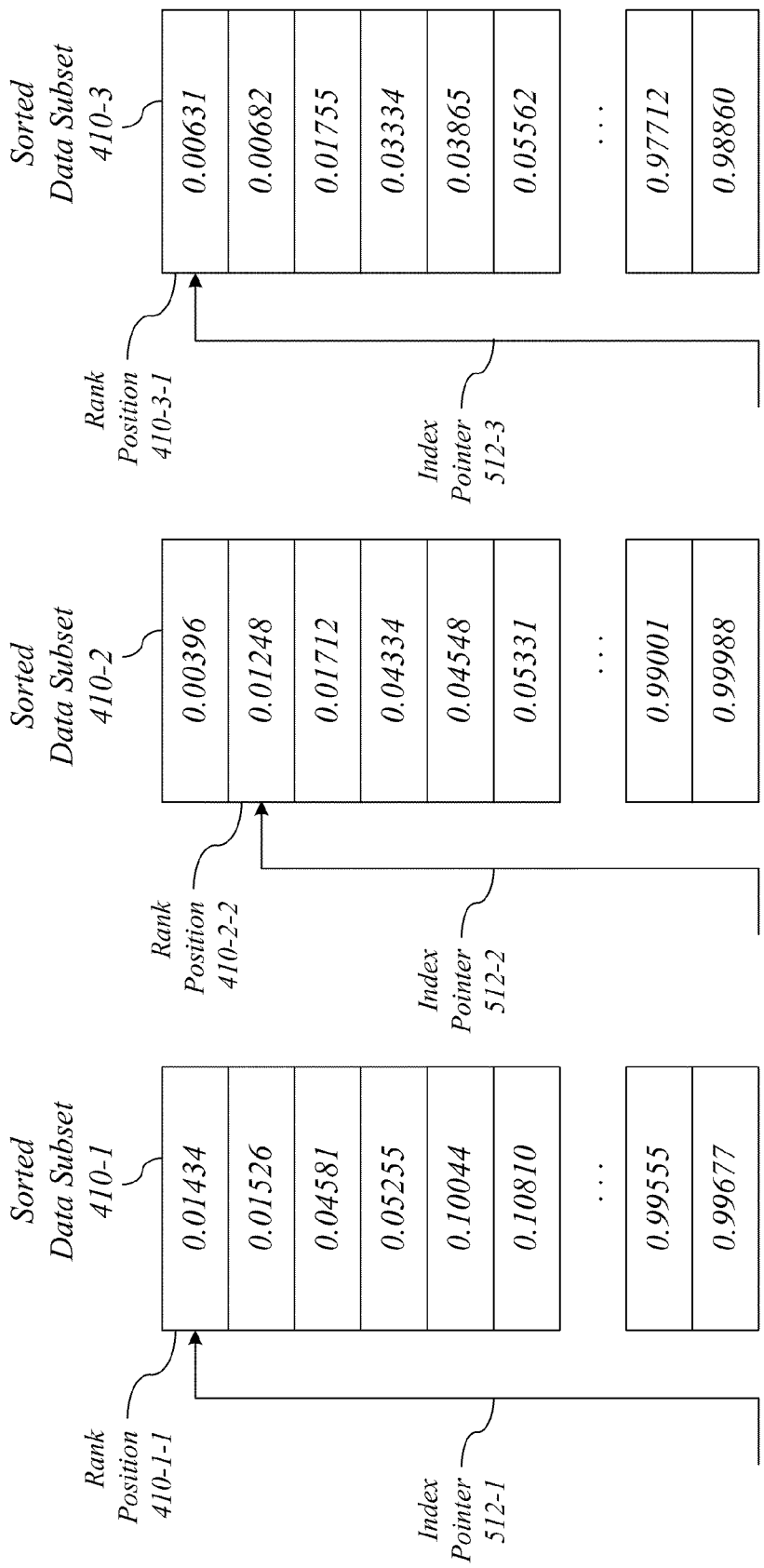
FIG. 6 illustrates an embodiment of a logic diagram for search operations.

FIG. 6 illustrates a logic diagram 600 for merge operations performed by the merge algorithm 240. Since the lowest value of "0.01434, 0.00396 and 0.00631" is "0.00396," which is located at the rank position 410-2-1 of the second sorted data subset 410-2, the second index pointer 512-2 is advanced to point to the rank position 410-2-2 of the second sorted data subset 410-2. The merge algorithm 240 compares the data items at rank positions 410-1-1, 410-2-2 and 410-3-1 to find a lowest value. The lowest value of "0.01434, 0.01248 and 0.00631" is "0.00631," which is located at the rank position 410-3-1 of the third sorted data subset 410-3.

Figure 7:
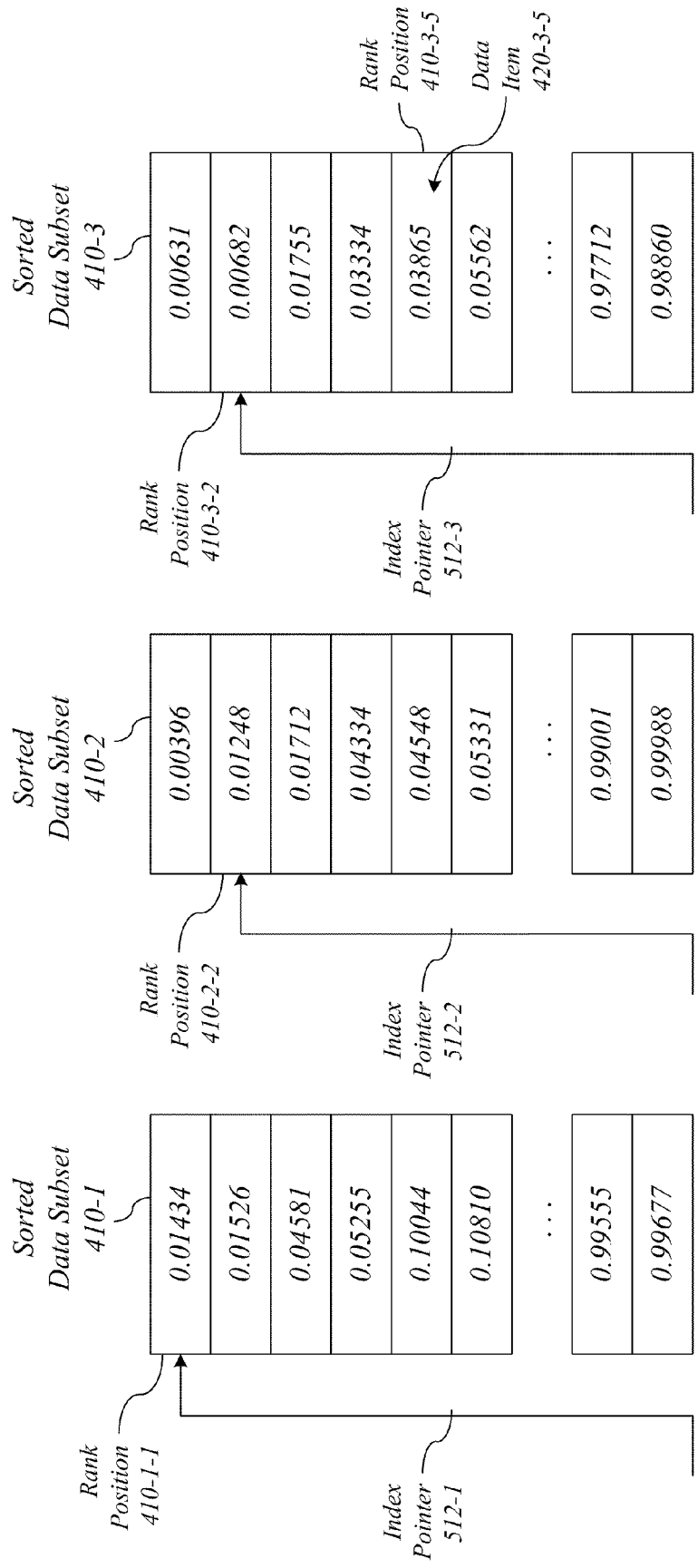
FIG. 7 illustrates an embodiment of a logic diagram for search operations.

FIG. 7 illustrates a logic diagram 700 for merge operations performed by the merge algorithm 240. Since the lowest value of "0.01434, 0.01248 and 0.00631" is "0.00631," which is located at the rank position 410-3-1 of the third sorted data subset 410-3, the third index pointer 512-3 is advanced to point to the rank position 410-3-2 of the third sorted data subset 410-3. The merge algorithm 240 compares the data items at rank positions 410-1-1, 410-2-2 and 410-3-2 to find a lowest value. The lowest value of "0.01434, 0.01248 and 0.00682" is "0.00682," which is located at the rank position 410-3-3 of the third sorted data subset 410-3. Since the lowest value of "0.01434, 0.01248 and 0.00682" is "0.00682," which is located at the rank position 410-3-3 of the third sorted data subset 410-3, the third index pointer is advanced to point to the rank position 410-3-3 of the third sorted data subset 410-3. The merge algorithm 240 continues the merge operations until the target data item 232 of the fifth percentile is found based on the merge value 214 which is equal to 2, which in this example, is the data item 420-3-5 having a value of "0.03865" located in the third sorted data subset 410-3 at rank position 410-3-5.

While the merge algorithm 240 seems effective, it suffers from some serious performance limitations. For example, there are two major computational loops in this process. The outer loop is bounded by the rank position derived by the desired percentile rank, and the inner loop is bounded by the number of sorted data subsets 410-1-m. The limiting behavior of the function is shown in Equation (2) as follows:

$$O(rank*data\ subsets)$$ Equation (2)

Furthermore, retrieving a data item value at a given rank position from the remote computing devices 150-1-a may incur a serious performance cost due to network latency for distributed processes, which could lead to further limiting behavior of the function as shown in Equation (3) as follows:

$$O(rank * data\ subsets * network\ overhead) \qquad \text{Equation (3)}$$

In various embodiments, the merge algorithm 240 may implement various enhancements in an attempt to improve ranking times. For instance, a buffering scheme can be employed in an attempt to consolidate network calls. However, this still yields undesirable performance characteristics for many implementations. In another example, a slightly better merge process may be implemented by replacing the inner processing loop with a sorted data structure where the lowest value can be "popped" off and the next value inserted in logn time. This may yield results as shown in Equation (4) as follows:

$$O(rank * (\log\ data\ subsets)) \qquad \text{Equation (4)}$$

However, this improvement may be insufficient for many commercial applications, particularly when the total data set 140 has a total data set size 202 on the order to terabytes or larger.

Various embodiments implement enhanced ranking techniques that may be used to find a percentile value by reducing or removing the limiting behaviors of merge algorithm 240. In various embodiments, the iterative correlation algorithm 230 of the correlation module 106 may be used alone, or in combination with, the merge algorithm 240, to find the target data item 232 more efficiently than using the merge algorithm 240 by itself.

Figure 8:
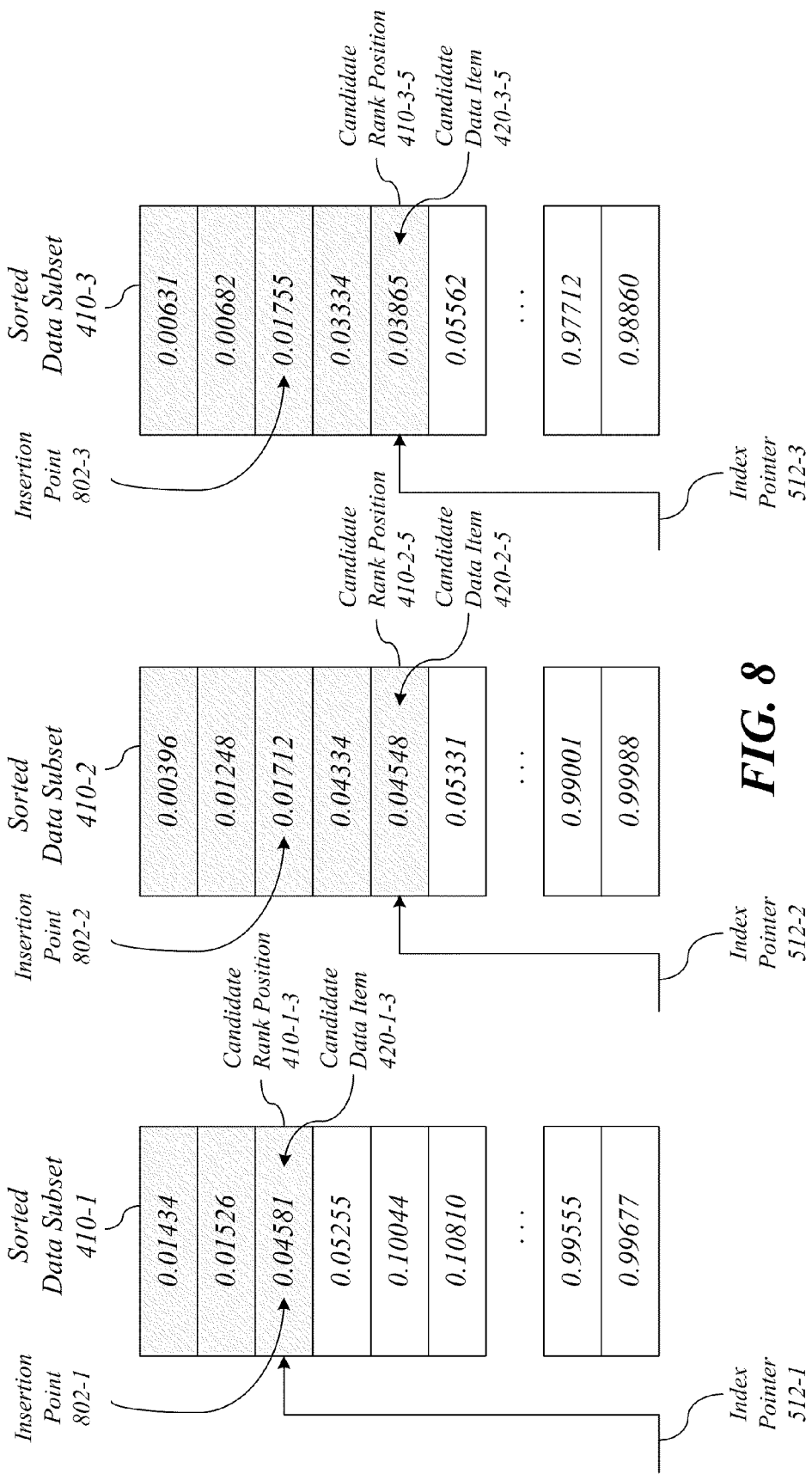
FIG. 8 illustrates an embodiment of a logic diagram for search operations.

FIG. 8 illustrates a logic diagram 800 for correlation operations and/or merge operations performed by the respective iterative correlation algorithm 230 and/or the merge algorithm 240. In particular, the logic diagram 800 illustrates an example of the iterative correlation algorithm 230 determining a correlation value for the candidate data item 420-1-3 of "0.04581" from the sorted data subset 410-1.

In one embodiment, the correlation module 106 may receive the target percentile rank 202. The correlation module 106 may determine the target rank position 220 at the target percentile rank 202 within the total data set 140. The correlation module 106 may determine the target data item 232 at the target rank position 220 for the total data set 140 using candidate data items at candidate rank positions for each of multiple sorted data subsets 410-1-$m$ of the total data set 140. The correlation module 106 may generate and evaluate correlation values associated with each of the candidate data items to find the target data item 232. The correlation values represent an approximate rank position of the target data item 232, and may be iteratively used to isolate the target rank position 220 for the target data item 232.

The correlation module 106 may determine candidate rank positions for each of the sorted data subsets 410-1-$m$ from the target percentile rank 202 and the data subset size 206. For instance, using the same assumptions given for the example given for the merge algorithm 240, the target percentile rank 202 is the $5^{th}$ percentile (5%) and the data subset size 206 comprises a value of "67." Using Equation (1) again, where N=5 and p=67, the correlation module 106 may determine initial candidate rank position as a third position within each of the sorted data subsets 410-1-$m$. Therefore, in this example, the initial candidate rank positions for the sorted data subsets 410-1, 410-2 and 410-3 are respective rank positions 410-1-3, 410-2-3 and 410-3-3.

Once the correlation module 106 determines the initial candidate rank positions, the correlation module 106 may retrieve a candidate data item from the initial candidate rank position for each of the sorted data subsets 410-1-$m$. Continuing with the previous example, data item values for the candidate data items 420-1-3, 420-2-3 and 420-3-3 at the respective candidate rank positions 410-1-3, 410-2-3 and 410-3-3 are "0.04581, 0.01712 and 0.01755."

Once the initial candidate rank positions are identified, the correlation module 106 may determine a correlation value for each of the candidate data items at the initial candidate rank positions. This may be accomplished by using each of the candidate data items at the initial candidate rank positions as insertion points 802-1-$t$ for each sorted data subset 410-1-$m$. For instance, in the previous example, the data item values for the candidate data items 420-1-3, 420-2-3 and 420-3-3 at the respective candidate rank positions 410-1-3, 410-2-3 and 410-3-3 are respective values "0.04581, 0.01712 and 0.01755." The values "0.04581, 0.01712 and 0.01755" are used as respective insertion points 802-1, 802-2 and 802-3 within each of the sorted data subsets 410-1, 410-2 and 410-3. Once the insertion points 802-1, 802-2 and 802-3 have been identified, the iterative correlation algorithm 230 may begin computing a correlation value for each of the candidate data items starting at the insertion points 802-1, 802-2 and 802-3.

The iterative correlation algorithm 230 may determine a correlation value for each of the candidate data items at the candidate rank positions by determining a partial correlation value representing a number of data items within each sorted data subset with a value lower than or equal to a candidate data item. A correlation value for a given insertion point 802-1-$t$ may be computed using partial correlation values. Partial correlation values for a given insertion point 802-1-$t$ are computed based on a number of data items within a given sorted data subset 410-1-$m$ having data items of lower or equal value to the insertion point value for a given insertion point 802-1-$t$. A correlation value and a partial correlation value may each be generated by the iterative correlation algorithm 230.

The exemplary logic diagram 800 illustrates various states of the index pointers for the sorted data subsets 410-1-$m$ during operation of the iterative correlation algorithm 230. Using the values "0.04581, 0.01712 and 0.01755" as insertion points 802-1, 802-2 and 802-3 within each of the sorted data subsets 410-1, 410-2 and 410-3, the iterative correlation algorithm 230 begins determining a correlation value for each of the candidate data items 420-1-3, 420-2-3 and 420-3-3 at the respective insertion points 802-1, 802-2 and 802-3. The correlation value represents a number of data items found prior or equal to the given insertion point value at the insertion points 802-1, 802-2 and 802-3, which turns out to be the percentile rank of the value (e.g., 0.05*67=3). Where an insertion point value of an insertion point 802-1-$t$ "fits" within a given sorted data subset 410-1-$m$ can be determined using a binary search.

The logic diagram 800 illustrates various states of the index pointers for the sorted data subsets 410-1, 410-2 and 410-3 when the iterative correlation algorithm 230 is determining a correlation value for the candidate data item 420-1-3 having a value of "0.04581" from the sorted data subset 410-1. The iterative correlation algorithm 230 uses "0.04581" of the sorted data subset 410-1 as an insertion point value, and determines a number of data items having a value lower than or equal to "0.04581" in each of the sorted data subsets 410-1, 410-2 and 410-3. These numbers each represent a partial correlation value for the candidate data item 420-1-3 relative to each of the sorted data subsets 410-1, 410-2 and 410-3. The partial correlation values are summed to determine a correlation value for the candidate data item 420-1-3 having an insertion point value of "0.04581."

The iterative correlation algorithm 230 derives partial correlation values for the candidate data item 420-1-3 having a value of "0.04581" as follows. As shown in the logic diagram 800, the sorted data subset 410-1 has 3 data items lower than or equal to "0.04581" (e.g., 0.01434, 0.01526 and 0.04581), which is illustrated in the logic diagram 800 where the first index pointer 512-1 points to the candidate data item 420-1-3 at the candidate rank position 410-1-3. Therefore a first partial correlation value for the candidate data item 420-1-3 relative to the sorted data subset 410-1 is determined to be a value of 3. The sorted data subset 410-2 has 5 data items lower than or equal to "0.04581" (e.g., 0.00396, 0.01248, 0.01712, 0.04334 and 0.04548), which is illustrated in the logic diagram 800 where the second index pointer 512-2 points to the candidate data item 420-2-5 at the candidate rank position 410-2-5. Therefore a second partial correlation value for the candidate data item 420-1-3 relative to the sorted data subset 410-2 is determined to be a value of 5. The sorted data subset 410-3 also has 5 data items lower than or equal to "0.04581" (e.g., 0.00631, 0.00682, 0.01755, 0.03334 and 0.03865), which is illustrated in the logic diagram 800 where the third index pointer 5120-3 points to the candidate data item 420-3-5 at the candidate rank position 410-3-5. Therefore a third partial correlation value for the candidate data item 420-1-3 relative to the sorted data subset 410-3 is also determined to be 5.

Once the iterative correlation algorithm 230 determines partial correlation values each representing a number of data items within each sorted data subset 410-1, 410-2 and 410-3 with a value lower than or equal to the candidate data item 420-1-3, the iterative correlation algorithm 230 sums the partial correlation values for each sorted data subset 410-1, 410-2 and 410-3 to form a correlation value for the candidate data item 420-1-3. In this case, the iterative correlation algorithm 230 determines a correlation value for the candidate data item 420-1-3 of 0.04581 from the sorted data subset 410-1 by summing the first, second and third partial correlation values of "3, 5 and 5" to form a correlation value of "13" (e.g., 3+5+5=13).

Figure 9:
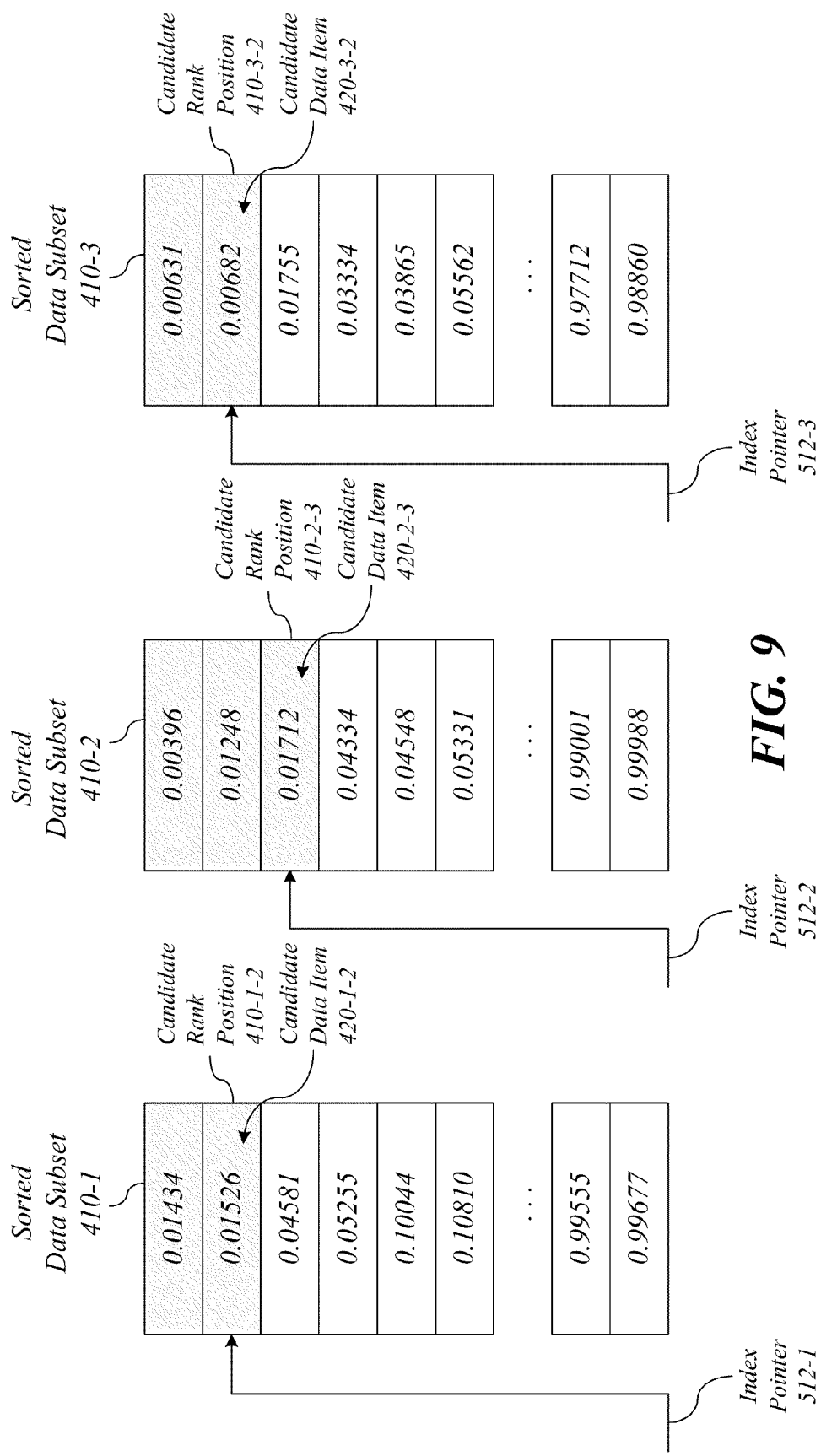
FIG. 9 illustrates an embodiment of a logic diagram for search operations.

FIG. 9 illustrates a logic diagram 900 for correlation operations and/or merge operations performed by the respective iterative correlation algorithm 230 and/or the merge algorithm 240. In particular, the logic diagram 900 illustrates an example of the iterative correlation algorithm 230 determining a correlation value for the candidate data item 420-2-3 of "0.01712" from the sorted data subset 410-2 using correlation operations similar to those described with reference to FIG. 8.

The iterative correlation algorithm 230 derives partial correlation values for the candidate data item 420-2-3 having a value of 0.01712 as follows. As shown in the logic diagram 900, the sorted data subset 410-1 has 2 data items lower than or equal to "0.01712" (e.g., 0.01434 and 0.01526), which is illustrated in the logic diagram 900 where the first index pointer 512-1 points to the candidate data item 420-1-2 at the candidate rank position 410-1-2. Therefore a first partial correlation value for the candidate data item 420-2-3 relative to the sorted data subset 410-1 is determined to be 2. The sorted data subset 410-2 has 3 data items lower than or equal to "0.01712" (e.g., 0.00396, 0.01248 and 0.01712), which is illustrated in the logic diagram 900 where the second index pointer 512-2 points to the candidate data item 420-2-3 at the candidate rank position 410-2-3. Therefore a second partial correlation value for the candidate data item 420-2-3 relative to the sorted data subset 410-2 is determined to be 3. The sorted data subset 410-3 has 2 data items lower than or equal to "0.01712" (e.g., 0.00631 and 0.00682), which is illustrated in the logic diagram 900 where the third index pointer 512-3 points to the candidate data item 420-3-2 at the candidate rank position 410-3-2. Therefore a third partial correlation value for the candidate data item 420-2-3 relative to the sorted data subset 410-3 is determined to be 2.

Once the iterative correlation algorithm 230 determines partial correlation values each representing a number of data items within each sorted data subset 410-1, 410-2 and 410-3 with a value lower than or equal to the candidate data item 420-2-3, the iterative correlation algorithm 230 sums the partial correlation values for each sorted data subset 410-1, 410-2 and 410-3 to form a correlation value for the candidate data item 420-2-3. In this case, the iterative correlation algorithm 230 determines a correlation value for the candidate data item 420-2-3 of 0.01712 by summing the first, second and third partial correlation values of "2, 3 and 2" to form a correlation value of "7" (e.g., 2+3+2=7).

Figure 10:
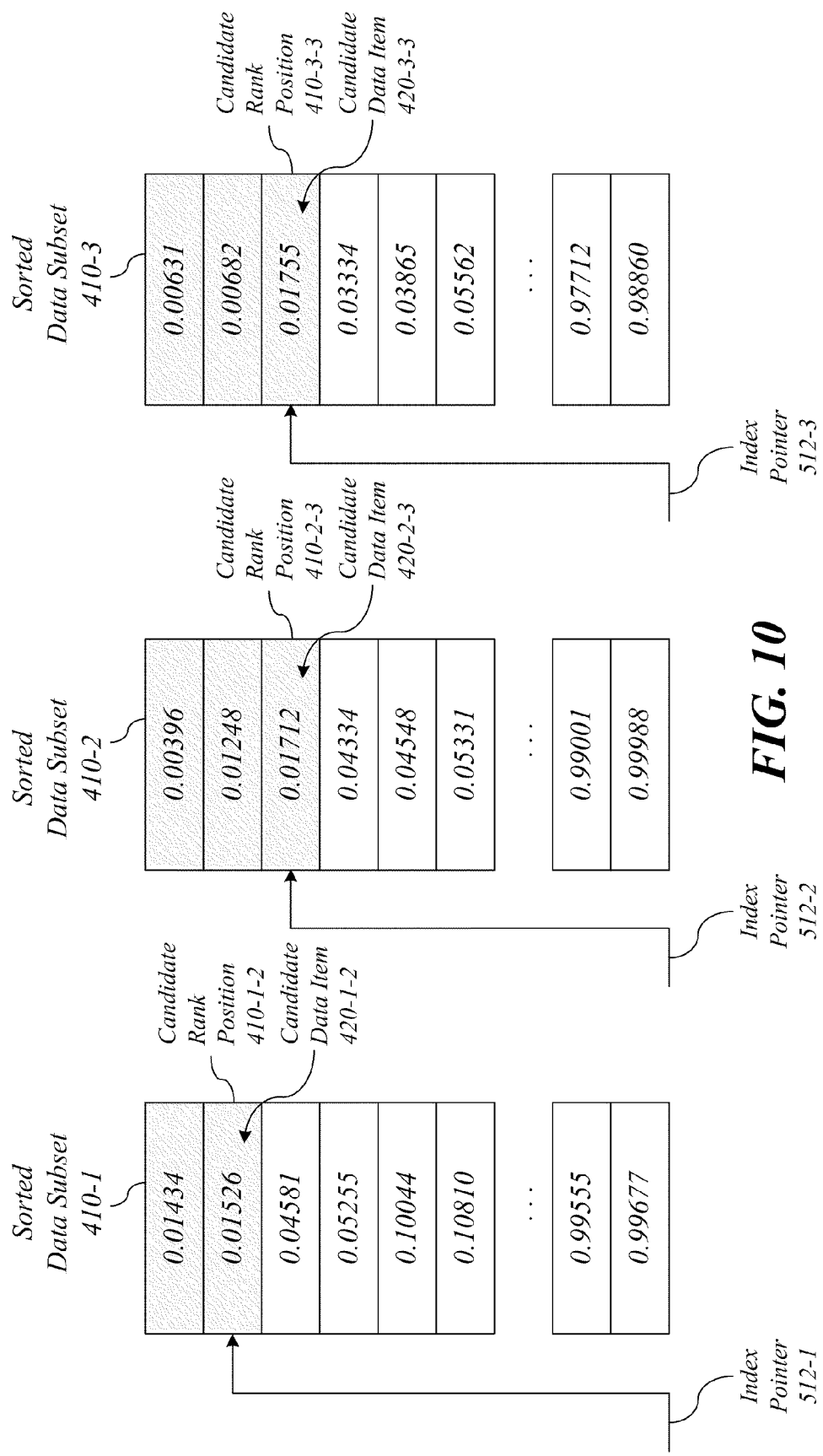
FIG. 10 illustrates an embodiment of a logic diagram for search operations.

FIG. 10 illustrates a logic diagram 1000 for correlation operations and/or merge operations performed by the respective iterative correlation algorithm 230 and/or the merge algorithm 240. In particular, the logic diagram 1000 illustrates an example of the iterative correlation algorithm 230 determining a correlation value for the candidate data item 420-3-3 of "0.01755" from the sorted data subset 410-3 using correlation operations similar to those described with reference to FIGS. 8, 9.

The iterative correlation algorithm 230 derives partial correlation values for the candidate data item 420-3-3 having a value of "0.01755" as follows. As shown in the logic diagram 1000, the sorted data subset 410-1 has "2" data items lower than or equal to "0.01755" (e.g., 0.01434 and 0.01526), which is illustrated in the logic diagram 1000 where the first index pointer 512-1 points to the candidate data item 420-1-2 at the candidate rank position 410-1-2. Therefore a first partial correlation value for the candidate data item 420-3-3 relative to the sorted data subset 410-1 is determined to be "2." The sorted data subset 410-2 has "3" data items lower than or equal to "0.01755" (e.g., 0.00396, 0.01248 and 0.01712), which is illustrated in the logic diagram 1000 where the second index pointer 512-2 points to the candidate data item 420-2-3 at the candidate rank position 410-2-3. Therefore a second partial correlation value for the candidate data item 420-3-3 relative to the sorted data subset 410-2 is determined to be "3." The sorted data subset 410-3 has "3" data items lower than or equal to "0.01755" (e.g., 0.00631, 0.00682 and 0.01755), which is illustrated in the logic diagram 1000 where the third index pointer 512-3 points to the candidate data item 420-3-3 at the candidate rank position 410-3-3. Therefore a third partial correlation value for the candidate data item 420-3-3 relative to the sorted data subset 410-3 is determined to be "3."

Once the iterative correlation algorithm 230 determines partial correlation values each representing a number of data items within each sorted data subset 410-1, 410-2 and 410-3 with a value lower than or equal to the candidate data item 420-3-3, the iterative correlation algorithm 230 sums the partial correlation values for each sorted data subset 410-1, 410-2 and 410-3 to form a correlation value for the candidate data item 420-3-3. In this case, the iterative correlation algorithm 230 determines a correlation value for the candidate data item 420-3-3 of "0.01755" by summing the first, second and third partial correlation values of "2, 3 and 3" to form a correlation value of "8" (e.g., 2+3+3=8).

Once the iterative correlation algorithm 230 determines a correlation value for each of the candidate data items 420-1-3, 420-2-3 and 420-3-3, the iterative correlation algorithm 230 compares the correlation values for each of the candidate data items 420-1-3, 420-2-3 and 420-3-3 to find a correlation value closest to the target rank position 220 and not exceeding the target rank position 220. In this example, the target rank position 220 is 10. Therefore the correlation value closest to the target rank position 220 and not exceeding the target rank position 220 is the candidate data item 420-3-3 having a value of "0.01755" which has a correlation value of "8." It is worthy to note that the correlation value for the candidate data item 420-3-3 having a value of "0.01712" is not chosen because it has a correlation value of "7" which is less than the correlation value "8" of "0.01755," and the correlation value for the candidate data item 420-1-3 having a value of "0.04581" is not chosen because it has a correlation value of "13" which is greater than the target rank position 220 of "10."

If the iterative correlation algorithm 230 determines that a closest correlation value matches the target rank position 220, then the iterative correlation algorithm 230 selects the candidate data item associated with the closest correlation value as the target data item. In this case, if any of the correlation values "13, 7 and 8" had matched the target rank position 220 of "10," then the iterative correlation algorithm 230 would have selected the matching candidate data item as the target data item 232. However, since none of the correlation values "13, 7 and 8" matched the target rank position 220 of "10," the correlation module 106 and/or the merge module 110 may continue processing operations from this point to find the exact target data item 232, as described with reference to FIGS. 11-13.

Figure 11:
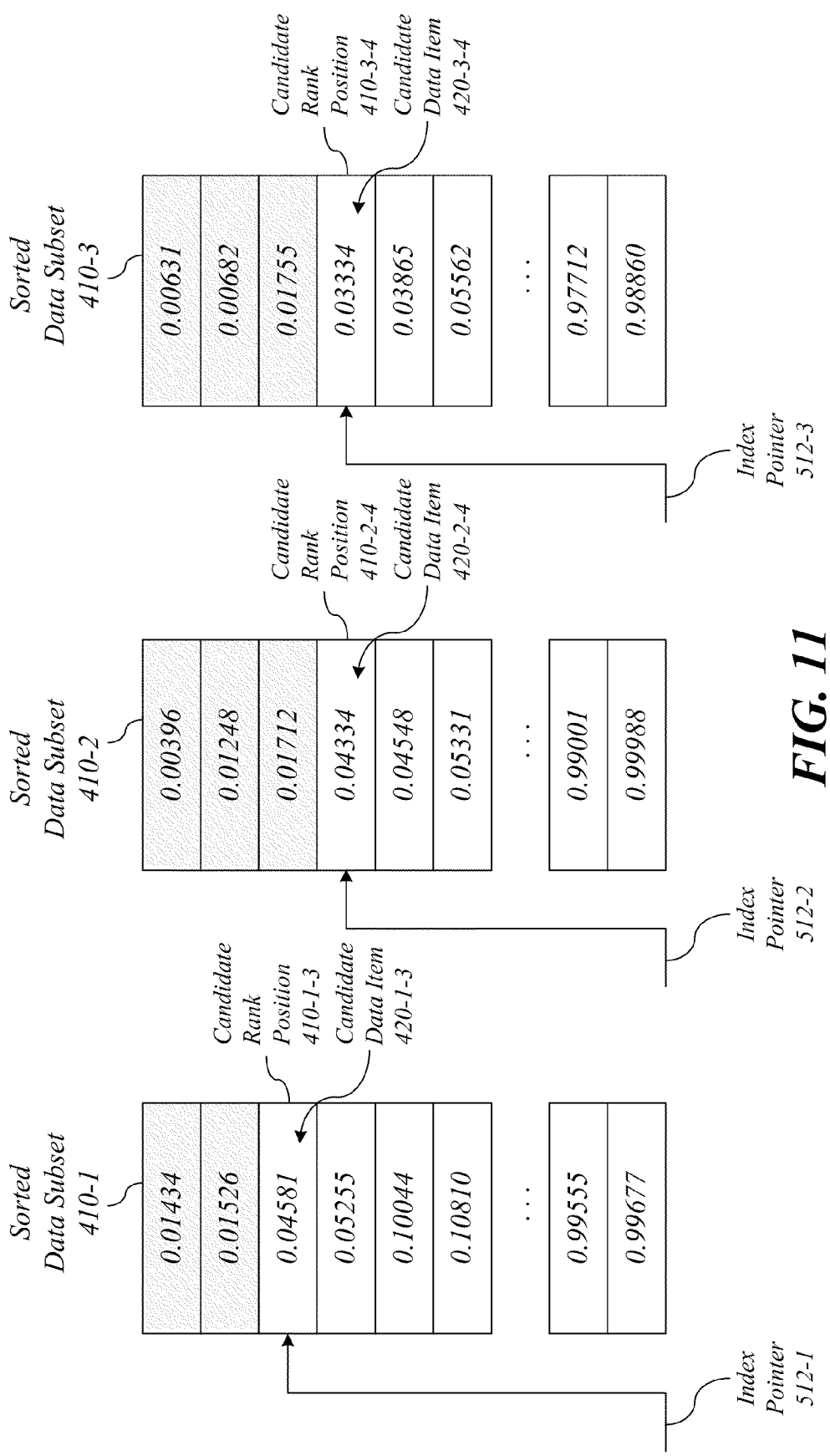
FIG. 11 illustrates an embodiment of a logic diagram for search operations.

FIG. 11 illustrates a logic diagram 1100 for correlation operations and/or merge operations performed by the respective iterative correlation algorithm 230 and/or the merge algorithm 240. In various embodiments, the iterative correlation algorithm 230 may be used in combination with a merge algorithm 240 of the merge module 110. For instance, the iterative correlation algorithm 230 may complete one or more iterations of correlation operations on a set of candidate data items 420-1-$m$. If a match has not been found after the one or more iterations, the iterative correlation algorithm 230 may output a set of starting candidate data items 212-1-$v$ for use as starting positions for merge operations performed by the merge algorithm 240 of the merge module 110. The iterative correlation algorithm 230 may also output a merge value 214 indicating a number of merge operations needed until the target data item 232 at the target rank position 220 is found. In one embodiment, the iterative correlation algorithm 230 may compute the merge value by subtracting a closest correlation value from the target rank position 220.

The merge module 110 may receive as input the starting candidate data items 212-1-$v$ and the merge value 214, and perform a number of merge operations indicated by the merge value 214 beginning at the starting candidate data items 212-1-$v$ until the specific target data item 232 at the target rank position 220 is found. In one embodiment, the merge operations may comprise comparing candidate data items 420-1-$m$ from each of the sorted data subsets 410-1-$m$ to find a candidate data item 420-1-$m$ with a lowest (or highest) value, updating an index pointer for the sorted data subset 410-1-$m$ with the lowest (or highest) value, and continuing such operations until the target data item 232 at the target rank position 220 is found. Typically the number of merge operations needed after correlation operations of the iterative correlation algorithm 240 is significantly less than a number of merge operations used by the merge algorithm 240 alone in finding the specific target data item 232 at the target rank position 220.

In the exemplary logic diagram 1100, the merge algorithm 240 begins processing at the starting candidate data items 212-1-$v$ within each of the sorted data subsets 410-1-$m$ discovered by the closest correlation value to the target rank position 220. In the previous example, the correlation value closest to the target rank position 220 and not exceeding the target rank position 220 is the candidate data item 420-3-3 having a value of "0.01755" which has a correlation value of "8." The iterative correlation algorithm 230 may compute the starting candidate data items 212-1, 212-2 and 212-3 within each of the sorted data subsets 410-1, 410-2 and 410-3 by incrementing each of the index pointers 512-1, 512-2 and 512-3 to point to the next candidate data item after the last candidate data item used to calculate the partial correlation value for the candidate data item 420-3-3 relative to the sorted data subsets 410-1, 410-2 and 410-3. As shown, the candidate data items 420-1-2, 420-2-3 and 420-3-3 were used to calculate the partial correlation value of "8." The iterative correlation algorithm 230 generates the starting candidate data items 212-1, 212-2 and 212-3 within each of the sorted data subsets 410-1, 410-2 and 410-3 as the candidate data items 420-1-3, 420-2-4 and 420-3-4 which are the very next candidate data items after the candidate data items 420-1-2, 420-2-3 and 420-3-3.

The iterative correlation algorithm 230 generates the merge value 214 as the target rank position 220 minus the closest correlation value. In this example, the target rank position 220 is "10" and the closest correlation value is "8," and therefore the merge value 214 is determined to be "2." Therefore the merge algorithm 240 iterates a total of twice (e.g., 10−8=2) to find the $5^{th}$ percentile value of "0.03865." For instance, the merge algorithm 240 compares the values "0.04581, 0.04334 and 0.03334" of the respective candidate data items 420-1-3, 420-2-4 and 420-3-4 and finds the lowest value. In this case, the lowest value of "0.04581, 0.04334 and 0.03334" is "0.03334." The merge algorithm 240 increments the third index pointer 512-3 of the sorted data subset 410-3 to point to the candidate data item 420-3-5, and compares the values "0.04581, 0.04334 and 0.03865" of the respective candidate data items 420-1-3, 420-2-4 and 420-3-5 and finds the lowest value. In this case, the lowest value of "0.04581, 0.04334 and 0.03865" is "0.03865." After two iterations, the merge algorithm 240 determines the target data item 232 to be the data item value of "0.03865" from the candidate data item 420-3-5.

One of the advantages of using the iterative correlation algorithm 230 is that the limiting behavior of the correlation does not contain the percentile rank like the merge algorithm 240. For each sorted data subset 410-1-$m$ having n elements, determining a correlation value may be performed using a binary search of the sorted data subset 410-1-$m$ as expressed in Equation (5) as follows:

$$O(\log n) \hspace{2cm} \text{Equation (5)}$$

Assuming a total number of elements are evenly divided into a sorted data subset 410-1-$m$ for each process, the percentile value from each sorted data subset 410-1-$m$ may be "fitted" within each sorted data subset 410-1-$m$, all values may be summed for each process, and the lowest value found as expressed in Equation (6) as follows:

$$\text{data subset}^2 * O(\log(\text{total elements}/\text{data subset})) + \text{data subset}^2 \hspace{1cm} \text{Equation (6)}$$

This approach assumes a single sorted data subset 410-1-$m$ per process, although it may be appreciated that multiple sorted data subsets 410-1-$m$ may belong to a single process.

Utilizing concurrent processing on each sorted data subset 410-1-$m$ may yield an even better limiting behavior since finding the "fit" of each value can be performed in parallel as expressed in Equation (7) as follows:

$$\text{data subset} * O(\log(\text{total elements/data subset})) + \text{data subset}^2 \qquad \text{Equation (7)}$$

It is worthy to note that since the percentile rank is no longer part of the limiting behavior finding the $5^{th}$ percentile (5%) will perform approximately the same as finding the $95^{th}$ percentile (95%).

In one embodiment, for example, the iterative correlation algorithm 230 may determine a closest correlation value does not match the target rank position 220. The correlation module 106 may notify the merge module 110 of its starting candidate data items 212-1-$v$ for merge operations. To enhance processing, the iterative correlation algorithm 230 may also eliminate one or more sorted data subsets 410-1-$m$ having a correlation value greater than the target rank position 220, and notify the merge module 110 accordingly. The merge algorithm 240 may perform merge operations starting at the starting candidate data items 212-1-$v$ for non-eliminated sorted data subsets 410-1-$m$ until a correlation value for a candidate data item matches the target rank position 220. An example for this enhancement may be described in more detail with reference to FIGS. 12, 13.

Figure 12:
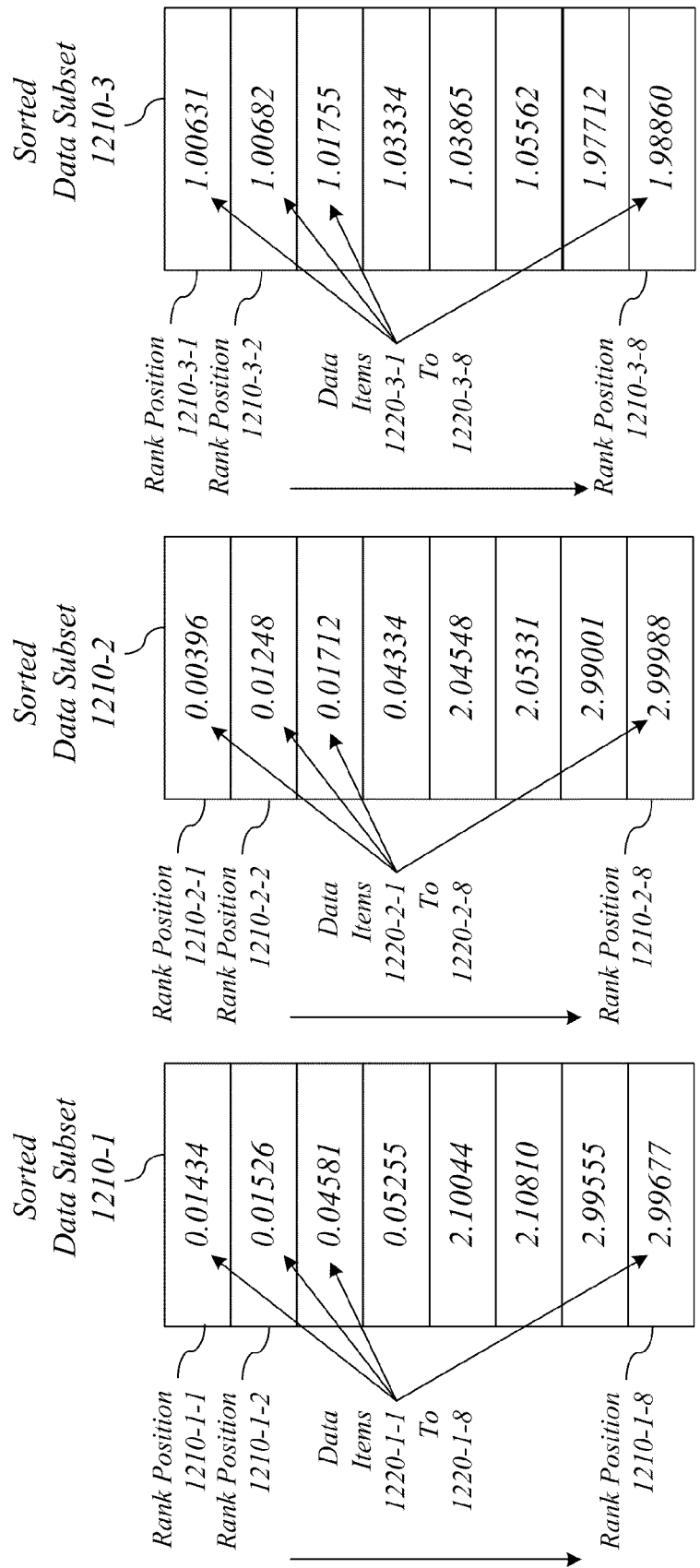
FIG. 12 illustrates an embodiment of a logic diagram for search operations.

FIG. 12 illustrates a logic diagram 1200 for correlation operations and/or merge operations performed by the respective iterative correlation algorithm 230 and/or the merge algorithm 240. In some embodiments, merge operations performed by the merge algorithm 240 may be further enhanced for improved performance. When data items from a given total data set 140 are well distributed between sorted data subsets, the iterative correlation algorithm 230 performs very well at estimating the target data item 232 and the starting candidate data items 212-1-$v$ are relatively close to the final target data item 232. There will be some cases, however, when data are not evenly distributed between sorted data subsets.

The logic diagram 1200 illustrates an example where first and second sorted data subsets 1210-1, 1210-2 have a large gap in values while a third sorted data subset 1210-3 has data item values which fall within the gaps. Logic diagram 1200 illustrates data items 1220-1-1 through 1220-1-8 of respective rank positions 1210-1-1 through 1210-1-8 of a first sorted data subset 1210-1, data items 1220-2-1 through 1220-2-8 of respective rank positions 1210-2-1 through 1210-2-8 of a second sorted data subset 1210-2, and data items 1220-3-1 through 1220-3-8 of respective rank positions 1210-3-1 through 1210-3-8 of a third sorted data subset 1210-3. Note that values 0.05255, 2.10044 for respective data items 1220-1-4, 1220-1-5 have a relatively large gap in values, and the values 0.04334, 2.04548 for respective data items 1220-2-4, 1220-2-5 also have a relatively large gap in values, while the values for 1220-3-1 through 1220-3-8 have data item values falling within each of these large gaps. In some embodiments, the merge algorithm 240 may be modified to account for such a scenario to enhance merge operations and reduce ranking times.

Figure 13:
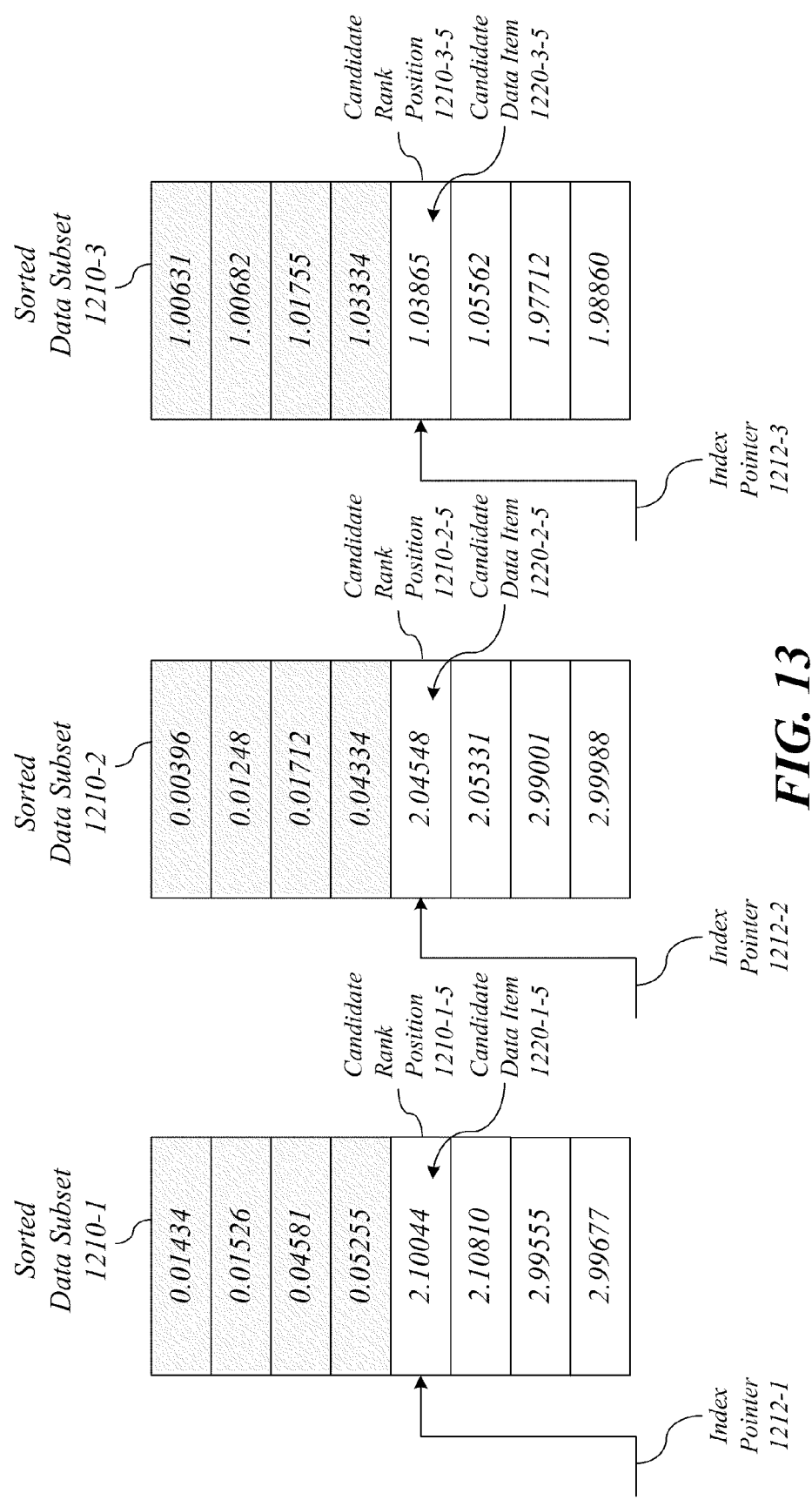
FIG. 13 illustrates an embodiment of a logic diagram for search operations.

FIG. 13 illustrates a logic diagram 1300 for correlation operations and/or merge operations performed by the respective iterative correlation algorithm 230 and/or the merge algorithm 240. Assume the iterative correlation algorithm 230 performs correlation operations to find a target data item 232 at a target percentile rank 202 of the $60^{th}$ percentile (60%), which yields starting points 1220-1-5, 1220-2-5 and 1220-3-5 for the respective sorted data subsets 1220-1, 1220-2 and 1220-3 for the merge algorithm 240. The closest correlation value is 12, while the target rank position 220 is 14 (e.g., the data item value is 1.05562). In this example, the first and second sorted data subsets 1220-1, 1220-2 do not contribute any additional values, and therefore they both can be safely ignored by the merge algorithm 240.

The iterative correlation algorithm 230 may determine which sorted data subsets to eliminate programmatically. For each of the values of the data items at the starting point in each sorted data subset, the iterative correlation algorithm 230 may find correlation values for each of the candidate data items. When finding the original correlation values during correlation operations, correlation values for a next insertion point can be returned as well to prevent another network call during this optimization operation. If any of the correlation values for the next insertion point are greater than the target rank position 220, the corresponding sorted data subsets can be safely eliminated. Since a number of sorted data subsets are part of the limiting factor for merge operations, reducing the number of sorted data subsets will have a positive impact on performance of the merge algorithm 240.

In the example shown in the logic diagram 1300, the iterative correlation algorithm 230 may determine correlation values for candidate data items 1220-1-5, 1220-2-5 and 1220-3-5 for the respective sorted data subsets 1220-1, 1220-2 and 1220-3 having the respective values of "2.10044, 2.04548 and 1.03865." The correlation values for candidate data items 1220-1-5, 1220-2-5 and 1220-3-5 are respective correlation values "18, 16 and 13." Since the target percentile rank 202 is the $60^{th}$ percentile of "24" data items, and the target rank position 220 is "14," the correlation values "18" and "16" are greater than the target rank position 220 of "14" and therefore the sorted data subsets 1220-1, 1220-2 can be safely eliminated. This example is an optimum case where there is only one sorted data subset 1220-3 remaining, which means the merge algorithm 240 can take the value at the next n positions (e.g., target rank position 220—original closest correlation value, or 14−12=2), thereby yielding the data item value of "1.05562" for the target data item 1220-3-6.

In some embodiments, the iterative correlation algorithm 230 may be used to determine a target data item 232 by itself without use of the merge algorithm 240. This may be accomplished by the iterative correlation algorithm 230 performing iterative correlation operations using new candidate data items until the target data item 232 is found. In one embodiment, for example, the iterative correlation algorithm 230 may determine a closest correlation value does not match the target rank position 220. The iterative correlation algorithm 230 may determine a new closest correlation value using a new set of correlation values for new candidate data items from new candidate rank positions. For instance, the new candidate data items may comprise the starting candidate data items 212-1-$v$ normally passed to the merge algorithm 240. The iterative correlation algorithm 230 may determine whether the new closest correlation value matches the target rank position 220. If there is a match, the iterative correlation algorithm 230 may select the new candidate data item associated with the new closest correlation value as the target data item 232. If there is not a match, the iterative correlation algorithm 230 may select new candidate data items and perform another iteration of correlation operations. This may continue until the target data item 232 is found.

In one embodiment, the iterative correlation algorithm 230 may be modified to choose a new correlation value for at least one new candidate data item from a new candidate rank position by taking a value at the current insertion point plus the target rank position 220 minus the closest correlation value divided by a relevant sorted data subsets 410-1-$m$. This re-correlation or optimization operation can be repeated until the latest correlation value is equal to the target rank position 220.

In one embodiment, the enhancements of eliminating irrelevant sorted data subsets and iterative correlation operations can be combined. For instance, after removing possible non-contributing sorted data subsets, if there are still multiple sorted data subsets remaining the iterative correlation algorithm can perform another iteration of correlation operations to get closer to the target rank position until a target data item 232 is found.

Although iterative correlation operations may offer several advantages, making network calls in a distributed environment may eventually become relatively expensive operations. Therefore, although iteratively correlating values will eventually yield the target data item 232, at some point there is a threshold where it will be less time consuming to request a buffer of the target rank position 220 minus the current correlation values from each relevant sorted data subset and perform merge operations using the merge algorithm 240.

Figure 14:
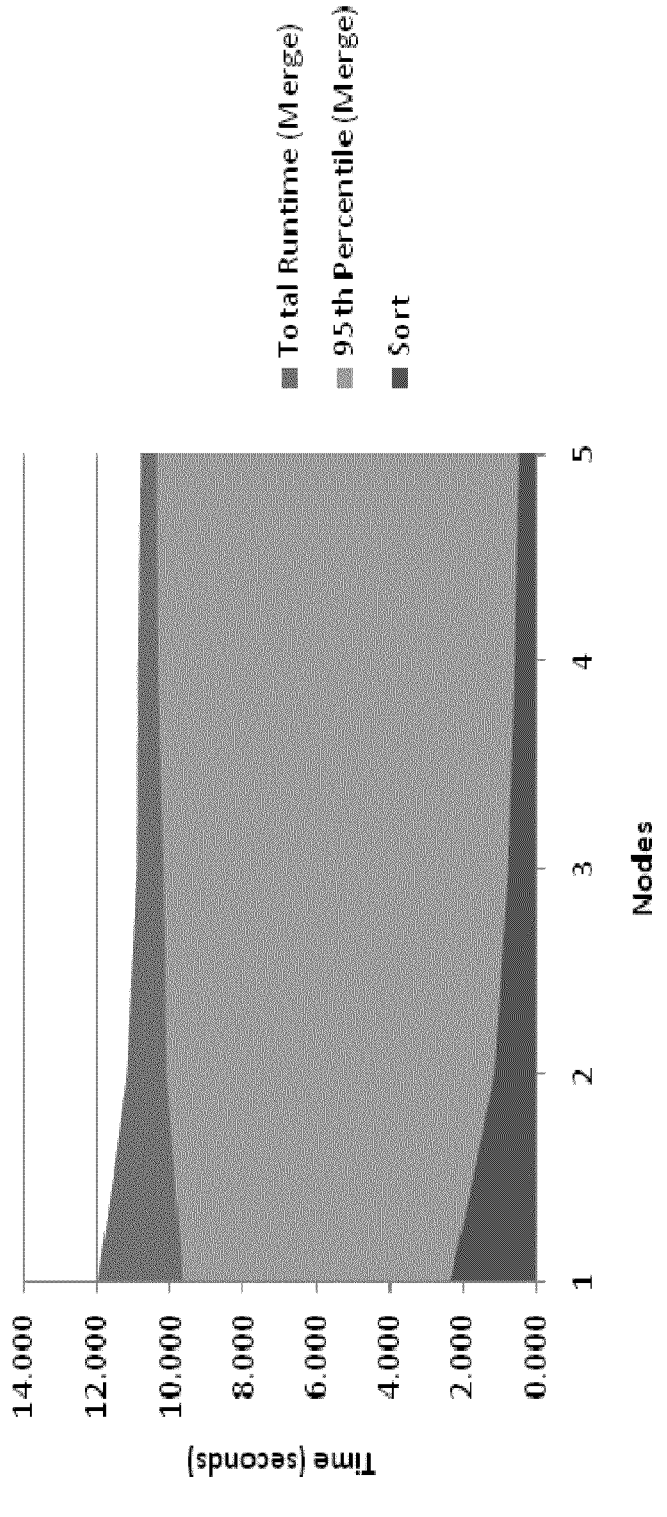
FIG. 14 illustrates an embodiment of a graph.

FIG. 14 illustrates an embodiment of a graph 1400. To model performance characteristics of the enhanced ranking techniques, several tests were run using a prototype which can distribute data among remote processing nodes. The tests were run with 10 million random elements (double-precision numbers) evenly distributed among the nodes. Wall clock times were gathered for the sort phase, the $95^{th}$ percentile phase, and the total elapsed time. Two passes were made. The first pass was made using the merge algorithm 240 alone. The second pass was made using the enhanced ranking techniques. Graph 1400 illustrates performance characteristics of the merge algorithm 240. Note that to find the $95^{th}$ percentile, 95 percent of the data (10 million double-precision numbers) must be transmitted to the local computing device 120. As shown by the graph 1400, while the time for sorting the elements decreases as more processing nodes are used, the time to find the $95^{th}$ percentile remains somewhat constant and takes an unacceptable amount of time for many implementations.

Figure 15:
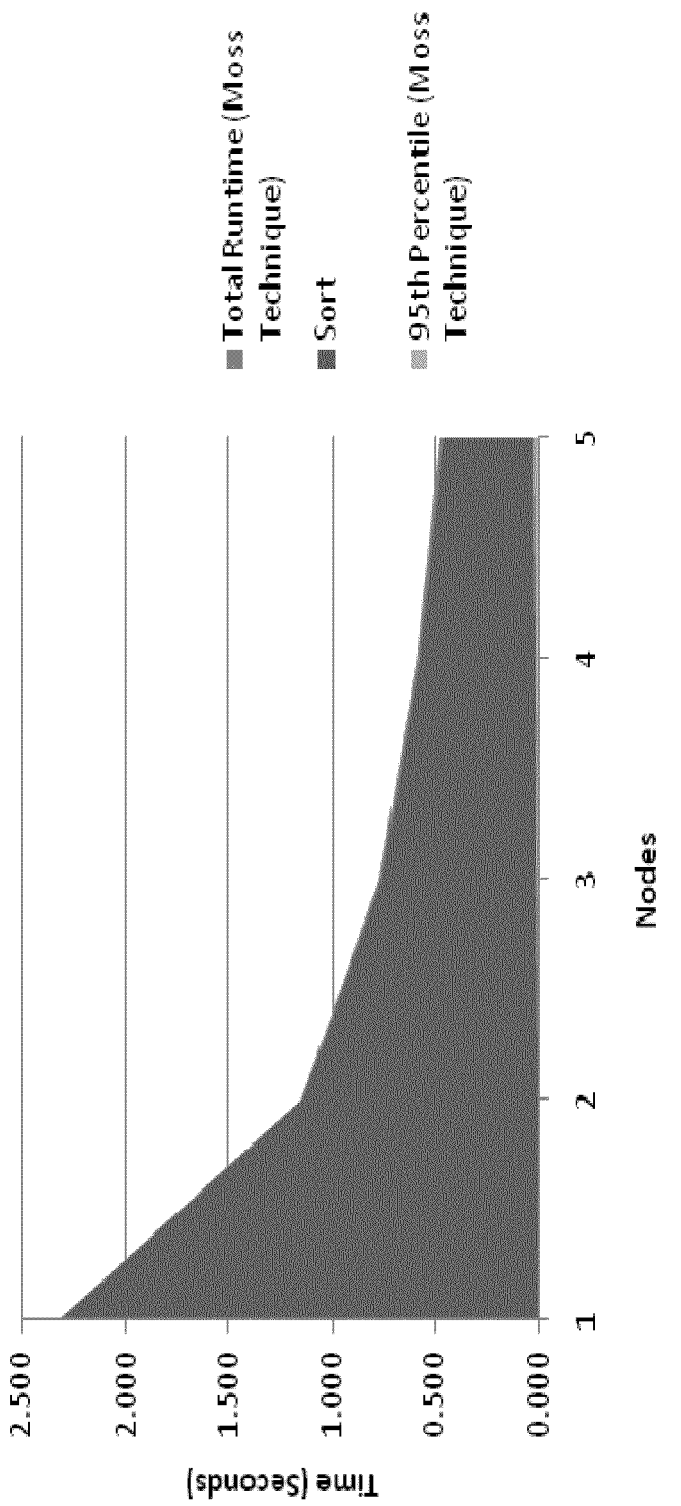
FIG. 15 illustrates an embodiment of a graph.

FIG. 15 illustrates an embodiment of a graph 1500. The graph 1500 illustrates performance characteristics of the iterative correlation algorithm 230. As shown by the graph 1500, a majority of total time is dominated by the sorting phase as more processing nodes are used, while the search time required to get the $95^{th}$ percentile value is negligible.

Figure 16:
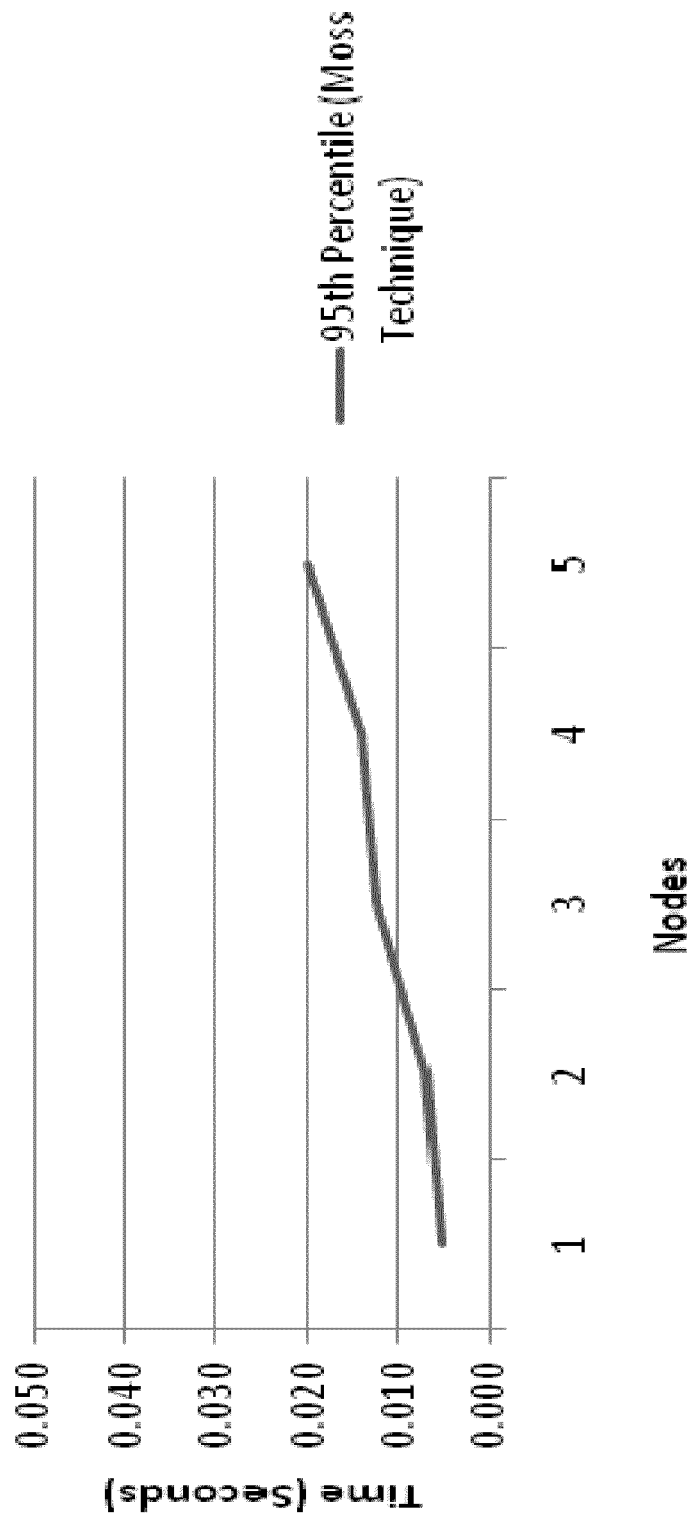
FIG. 16 illustrates an embodiment of a graph.

FIG. 16 illustrates an embodiment of a graph 1600. The graph 1600 illustrates performance characteristics of the iterative correlation algorithm 230, breaking out the search time required to get the $95^{th}$ percentile value. As shown by the graph 1600, the search time increases only slightly as data items are distributed across more processing nodes.

Figure 17:
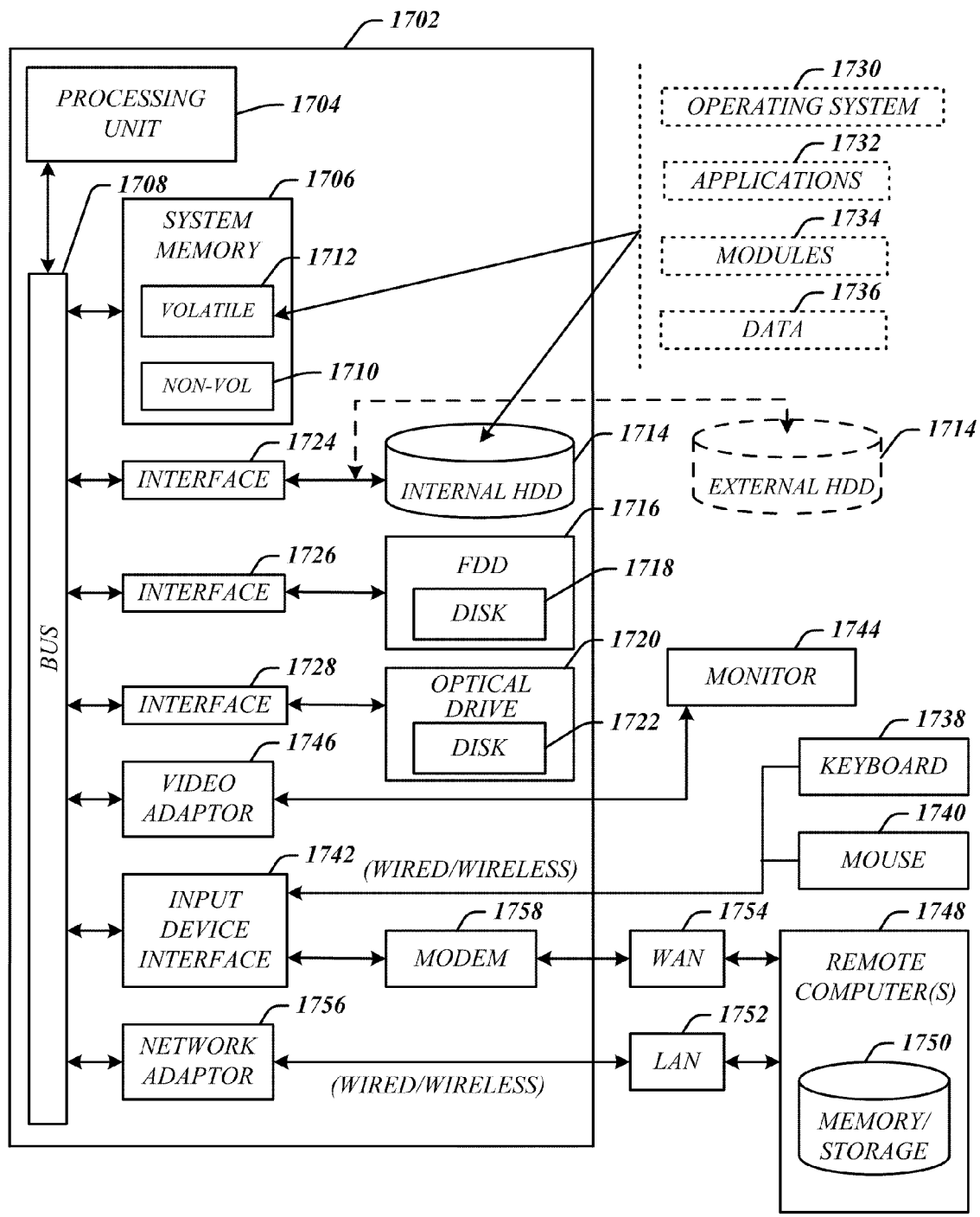
FIG. 17 illustrates an embodiment of a computing architecture.

FIG. 17 illustrates an embodiment of an exemplary computing architecture 1700 suitable for implementing various embodiments as previously described. The computing architecture 1700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1700.

As shown in FIG. 17, the computing architecture 1700 comprises a processing unit 1704, a system memory 1706 and a system bus 1708. The processing unit 1704 can be any of various commercially available processors. Dual microprocessors and other multi-processor architectures may also be employed as the processing unit 1704. The system bus 1708 provides an interface for system components including, but not limited to, the system memory 1706 to the processing unit 1704. The system bus 1708 can be any of several types of bus structure that may further interconnect to a memory bus (with or without a memory controller), a peripheral bus, and a local bus using any of a variety of commercially available bus architectures.

The system memory 1706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 17, the system memory 1706 can include non-volatile memory 1710 and/or volatile memory 1712. A basic input/output system (BIOS) can be stored in the non-volatile memory 1710.

The computer 1702 may include various types of computer-readable storage media, including an internal hard disk drive (HDD) 1714, a magnetic floppy disk drive (FDD) 1716 to read from or write to a removable magnetic disk 1718, and an optical disk drive 1720 to read from or write to a removable optical disk 1722 (e.g., a CD-ROM or DVD). The HDD 1714, FDD 1716 and optical disk drive 1720 can be connected to the system bus 1708 by a HDD interface 1724, an FDD interface 1726 and an optical drive interface 1728, respectively. The HDD interface 1724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1710, 1712, including an operating system 1730, one or more application programs 1732, other program modules 1734, and program data 1736. The one or more application programs 1732, other program modules 1734, and program data 1736 can include, for example, the ranking component 110, the correlation module 106, the sort module 108, the sort modules 118-1-s, and the merge module 110, among others.

A user can enter commands and information into the computer 1702 through one or more wire/wireless input devices, for example, a keyboard 1738 and a pointing device, such as a mouse 1740. Other input devices may include a microphone, an infrared (IR) remote control, a joystick, a game pad, a stylus pen, touch screen, or the like. These and other input devices are often connected to the processing unit 1704 through an input device interface 1742 that is coupled to the system bus 1708, but can be connected by other interfaces such as a parallel port, IEEE 1394 serial port, a game port, a USB port, an IR interface, and so forth.

A monitor 1744 or other type of display device is also connected to the system bus 1708 via an interface, such as a video adaptor 1746. In addition to the monitor 1744, a computer typically includes other peripheral output devices, such as speakers, printers, and so forth.

The computer 1702 may operate in a networked environment using logical connections via wire and/or wireless communications to one or more remote computers, such as a remote computer 1748. The remote computer 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wire/wireless connectivity to a local area network (LAN) 1752 and/or larger networks, for example, a wide area network (WAN) 1754. Such LAN and WAN networking environments are commonplace in offices and companies, and facilitate enterprise-wide computer networks, such as intranets, all of which may connect to a global communications network, for example, the Internet.

When used in a LAN networking environment, the computer 1702 is connected to the LAN 1752 through a wire and/or wireless communication network interface or adaptor 1756. The adaptor 1756 can facilitate wire and/or wireless communications to the LAN 1752, which may also include a wireless access point disposed thereon for communicating with the wireless functionality of the adaptor 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wire and/or wireless device, connects to the system bus 1708 via the input device interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 18:
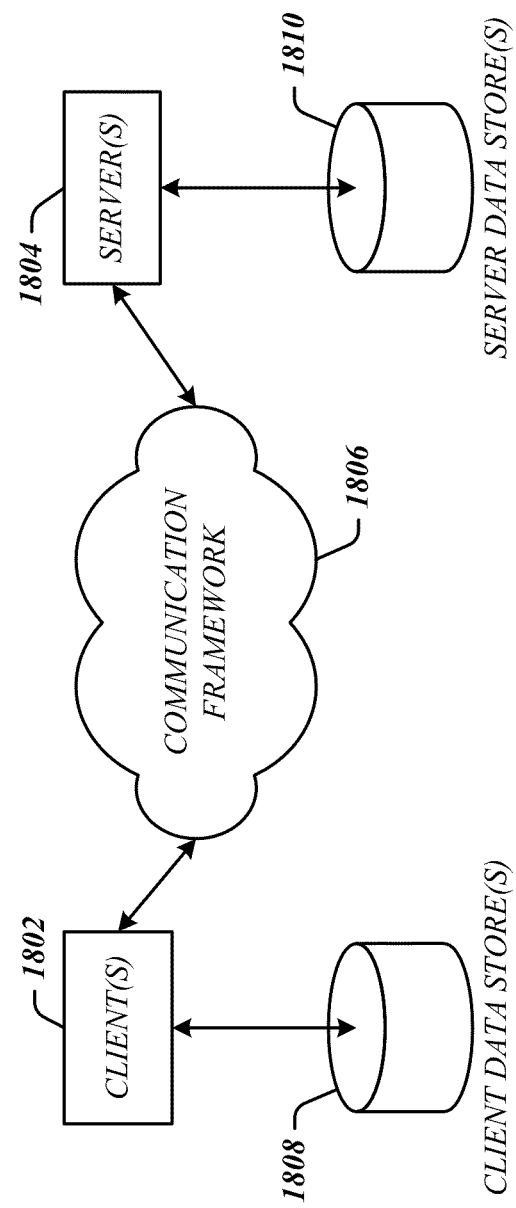
FIG. 18 illustrates an embodiment of a communications architecture.

FIG. 18 illustrates a block diagram of an exemplary communications architecture 1800 suitable for implementing various embodiments as previously described. The communications architecture 1800 includes various common communications elements, such as a transmitter, receiver, transceiver, radio, network interface, baseband processor, antenna, amplifiers, filters, and so forth. The embodiments, however, are not limited to implementation by the communications architecture 1800.

As shown in FIG. 18, the communications architecture 1800 comprises includes one or more clients 1802 and servers 1804. The clients 1802 may implement the local computing device 120. The servers 1804 may implement the remote computing devices 150-1-a. The clients 1802 and the servers 1804 are operatively connected to one or more respective client data stores 1808 and server data stores 1810 that can be employed to store information local to the respective clients 1802 and servers 1804, such as cookies and/or associated contextual information.

The clients 1802 and the servers 1804 may communicate information between each other using a communication framework 1806. The communications framework 1806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 1802 and the servers 1804 may include various types of standard communication elements designed to be interoperable with the communications framework 1806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 1802 and a server 1804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 312 C.F.R. Section 1.152(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
receiving a target percentile rank to identify a target rank position of a target data item;
determining the target rank position at the target percentile rank within a total data set distributed between one or more processors;
dividing the total data set into a plurality of data subsets;
allocating a data subset of the total data set to each processor;
sorting each allocated data subset to form sorted data subsets;
determining candidate rank positions for each of the sorted data subsets based on the target percentile rank and a data subset size representing a total number of data items within each of the sorted data subsets;
retrieving a candidate data item from a candidate rank position for each sorted data subset; and
determining the target data item at the target rank position for the total data set using the candidate data items at candidate rank positions from each of the sorted data subsets of the total data set, and correlation values associated with each of the candidate data items, each correlation value for each of the candidate data items from each of the sorted data subsets representing an approximate rank position of the target data item based on a summation of a number of data items within each sorted data subset with a value lower than or equal to the candidate data item for the sorted data subset and iteratively used to isolate the target rank position for the target data item.

2. The computer-implemented method of claim 1, comprising determining the target rank position for the total data set from the target percentile rank and a total data set size.

3. The computer-implemented method of claim 1, comprising determining a correlation value for each of the candidate data items at the candidate rank positions.

4. The computer-implemented method of claim 1, comprising determining an insertion point within each sorted data subset, the insertion point used to determine a correlation value for each of the candidate data items at the candidate rank positions.

5. The computer-implemented method of claim 1, comprising:
determining a partial correlation value representing a number of data items within each sorted data subset with a value lower than or equal to a candidate data item; and
summing the partial correlation values for each sorted data subset to form a correlation value for the candidate data item.

6. The computer-implemented method of claim 1, comprising comparing correlation values for each of the candidate data items to find a correlation value closest to the target rank position and not exceeding the target rank position.

7. The computer-implemented method of claim 1, comprising:
determining a closest correlation value matches the target rank position; and
selecting the candidate data item associated with the closest correlation value as the target data item.

8. The computer-implemented method of claim 1, comprising:
determining a closest correlation value does not match the target rank position; and performing a merge algorithm starting at a set of starting candidate rank positions until a candidate rank position for a candidate data item matches the target rank position.

9. The computer-implemented method of claim 1, comprising:
determining a closest correlation value does not match the target rank position;
eliminating one or more sorted data subsets having a correlation value greater than the target rank position; and
performing a merge algorithm starting at a set of starting candidate rank positions for non-eliminated sorted data subsets until a candidate rank position for a candidate data item matches the target rank position.

10. The computer-implemented method of claim 1, comprising:
determining a closest correlation value does not match the target rank position;
determining a new closest correlation value using a new correlation value for at least one new candidate data item from a new candidate rank position;
determining the new closest correlation value matches the target rank position; and
selecting the new candidate data item associated with the new closest correlation value as the target data item.

11. An article of manufacture comprising a storage medium containing instructions that when executed enable a system to:
determine a target rank position at a target percentile rank for a total data set;
divide the total data set into one or more data subsets;
allocate each of the one or more data subsets of the total data set to a particular one of one or more processors;
sort each allocated data subset to form sorted data subsets;
determine candidate rank positions for each of the sorted data subsets based on the target percentile rank and a data subset size representing a total number of data items within each of the sorted data subsets;
retrieve a candidate data item from a candidate rank position for each sorted data subset; and
determine a target data item at the target rank position for the total data set using candidate data items at candidate rank positions from each of the sorted data subsets of the total data set, and correlation values associated with each of the candidate data items, each correlation value for each of the candidate data items from each of the sorted data subsets representing an approximate rank position of the target data item based on a summation of a number of data items within each sorted data subset with a value lower than or equal to the candidate data item for the sorted data subset and iteratively used to isolate the target rank position for the target data item.

12. The article of claim 11, further comprising instructions that when executed enable the system to determine a correlation value for each of the candidate data items at the candidate rank positions.

13. The article of claim 11, further comprising instructions that when executed enable the system to determine a partial correlation value representing a number of data items within each sorted data subset with a value lower than or equal to a candidate data item, and sum the partial correlation values for each sorted data subset to form a correlation value for the candidate data item.

14. The article of claim 11, further comprising instructions that when executed enable the system to compare correlation values for each of the candidate data items to find a correlation value closest to the target rank position and not exceeding the target rank position.

15. The article of claim 11, further comprising instructions that when executed enable the system to determine a closest correlation value matches the target rank position, and select the candidate data item associated with the closest correlation value as the target data item.

16. The article of claim 11, further comprising instructions that when executed enable the system to determine a closest correlation value does not match the target rank position, perform a merge algorithm starting at a set of starting candidate rank positions until a correlation value for a candidate data item matches the target rank position.

17. An apparatus, comprising:
a processor; and
a memory unit communicatively coupled to the processor, the memory unit to store a correlation module that when executed by the processor is operative to:
determine a target rank position at a target percentile rank within a total data set,
divide the total data set into one or more data subsets,
allocate each of the one or more data subsets of the total data set to the processor,
sort each allocated data subset to form sorted data subsets,
determine candidate rank positions for each of the sorted data subsets based on the target percentile rank and a data subset size representing a total number of data items within each of the sorted data subsets,
retrieving a candidate data item from a candidate rank position for each sorted data subset, and
determine a target data item at the target rank position for the total data set using candidate data items at candidate rank positions from each of the sorted data subsets of the total data set, and correlation values associated with each of the candidate data items, each correlation value for each of the candidate data items from each of the sorted data subsets representing an approximate rank position of the target data item based on a summation of a number of data items within each sorted data subset with a value lower than or equal to the candidate data item for the sorted data subset and iteratively used to isolate the target rank position for the target data item.

18. The apparatus of claim 17, the correlation module operative to determine a correlation value for each of the candidate data items at the candidate rank positions.

19. The apparatus of claim 17, the correlation module operative to determine a partial correlation value representing a number of data items within each sorted data subset with a value lower than or equal to a candidate data item, and sum the partial correlation values for each sorted data subset to form a correlation value for the candidate data item.

20. The apparatus of claim 17, the correlation module operative to compare correlation values for each of the candidate data items to find a correlation value closest to the target rank position and not exceeding the target rank position.

21. The apparatus of claim 17, the correlation module operative to determine a closest correlation value matches the target rank position, and select the candidate data item associated with the closest correlation value as the target data item.

22. The apparatus of claim 17, comprising:
the correlation module operative to determine a closest correlation value does not match the target rank position; and a merge module operative to perform a merge algorithm starting at a set of starting candidate rank positions until a candidate rank position matches the target rank position.

23. The apparatus of claim 17, comprising:
the correlation module operative to determine a closest correlation value does not match the target rank position, and eliminate one or more sorted data subsets having a correlation value greater than the target rank position; and
a merge module operative to perform a merge algorithm starting at a set of starting candidate rank positions for non-eliminated sorted data subsets until a candidate rank position for a candidate data item matches the target rank position.

24. The apparatus of claim 17, comprising a sort module implemented by a local computing device and communicatively coupled to the correlation module, the sort module operative to sort one or more data subsets of the total data set to form one or more of the sorted data subsets.

25. The apparatus of claim 17, comprising a sort module implemented by a remote computing device and communicatively coupled to the correlation module, the sort module operative to sort one or more data subsets of the total data set to form one or more of the sorted data subsets.

26. The apparatus of claim 17, comprising multiple sort modules each implemented by different computing devices and communicatively coupled to the correlation module, each of the sort modules operative to sort a data subset of the total data set to form one of the sorted data subsets.

27. A computer-implemented method, comprising:
receiving a target percentile rank to identify a target rank position of a target data item;
determining the target rank position at the target percentile rank within a total data set distributed between one or more processors;
dividing the total data set into a plurality of data subsets;
allocating a data subset of the total data set to each processor;
sorting each allocated data subset to form sorted data subsets;
determining candidate rank positions for each of the sorted data subsets based on the target percentile rank and a data subset size representing a total number of data items within each of the sorted data subsets;
retrieving a candidate data item from a candidate rank position for each sorted data subset;
determining the target data item at the target rank position for the total data set using candidate data items at candidate rank positions from each of the sorted data subsets of the total data set, and correlation values associated with each of the candidate data items, each correlation value for each of the candidate items from each of the sorted data subsets representing an approximate rank position of the target data item based on a summation of a number of data items within each sorted data subset with a value lower than or equal to the candidate data item for sorted data subset and iteratively used to isolate the target rank position for the target data item;
comparing correlation values for each of the candidate data items to find a correlation value closest to the target rank position and not exceeding the target rank position;
determining a closest correlation value does not match the target rank position; and
performing a merge algorithm starting at a set of starting candidate rank positions until a candidate rank position for a candidate data item matches the target rank position.

* * * * *